United States Patent [19]

Sugiura et al.

[11] Patent Number: 4,733,275
[45] Date of Patent: Mar. 22, 1988

[54] SYSTEM FOR STORAGE AND PRINTING A PLURALITY OF IMAGES

[75] Inventors: Susumu Sugiura, Yamato; Tadashi Sato, Kokubunji; Norio Nakajima, Hachiohji, all of Japan

[73] Assignee: Canon Kabushiki Kaisha, Tokyo, Japan

[21] Appl. No.: 45,233

[22] Filed: May 4, 1987

Related U.S. Application Data

[63] Continuation of Ser. No. 910,785, Sep. 23, 1986, abandoned, which is a continuation of Ser. No. 842,712, Mar. 19, 1986, abandoned, which is a continuation of Ser. No. 775,116, Sep. 12, 1985, abandoned, which is a continuation of Ser. No. 706,974, Mar. 1, 1985, abandoned, which is a continuation of Ser. No. 586,646, Mar. 7, 1984, Pat. No. 4,505,576, which is a continuation of Ser. No. 390,025, Jun. 18, 1982, abandoned, which is a continuation of Ser. No. 201,537, Oct. 28, 1980, abandoned.

[30] Foreign Application Priority Data

Oct. 30, 1979 [JP] Japan .................. 54-140783

[51] Int. Cl.[4] .................. G03G 14/00
[52] U.S. Cl. .................. 355/14 C; 355/14 R; 355/3 R
[58] Field of Search .................. 355/3 R, 14 R, 14 C, 355/14 CH, 7, 8; 358/300; 365/112

[56] References Cited

U.S. PATENT DOCUMENTS

| | | | |
|---|---|---|---|
| 3,898,627 | 8/1975 | Hooker et al. | 355/3 R X |
| 4,046,471 | 9/1977 | Branham et al. | 355/14 R |
| 4,122,462 | 10/1978 | Hirayama et al. | 355/3 R X |
| 4,169,275 | 9/1979 | Gunning | 355/8 X |
| 4,204,725 | 5/1980 | DiStefano et al. | 355/3 R |
| 4,315,684 | 2/1982 | Suguira et al. | 355/14 R |

Primary Examiner—A. C. Prescott
Attorney, Agent, or Firm—Fitzpatrick, Cella, Harper & Scinto

[57] ABSTRACT

A copying apparatus includes an exposing unit for exposing an original document, a memory, a circuit for causing a plurality of original document images to be stored in the memory, a read out circuit for reading out the original images from the memory, a printing unit for printing the read out image on a copy medium, a manual numerical input device, an addressing circuit for selectively addressing a desired one of the document images stored in the memory in accordance with a data entered by the numerical input device, and a control circuit for controlling the read out circuit by the addressing circuit so as to read out the desired one document image selected by the addressing circuit and print the same on the copy medium. The control circuit is adapted to repeat the read out of the selected image from the memory so as to repeat copying by a number of times entered by the numerical input device.

37 Claims, 26 Drawing Figures

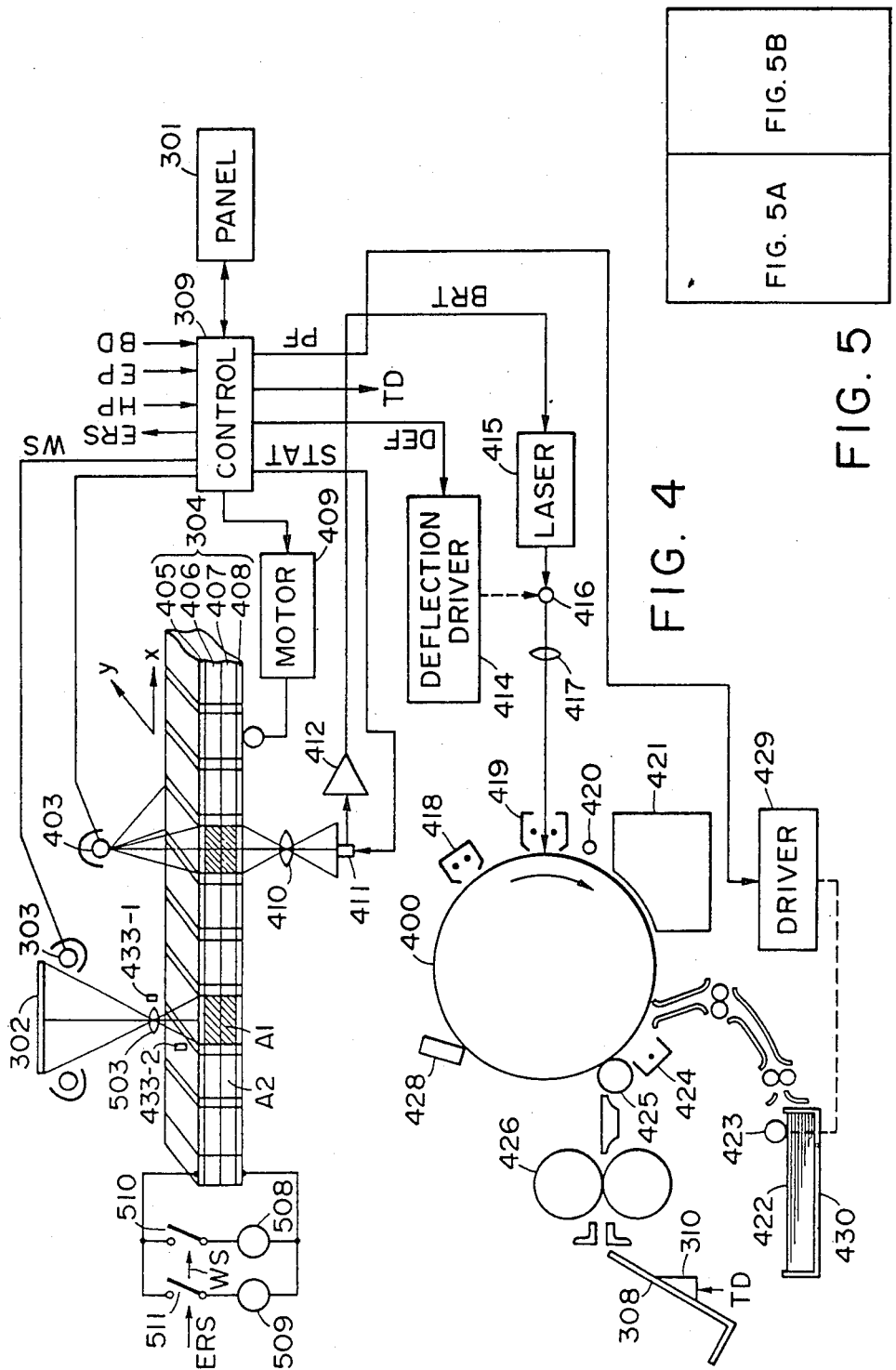

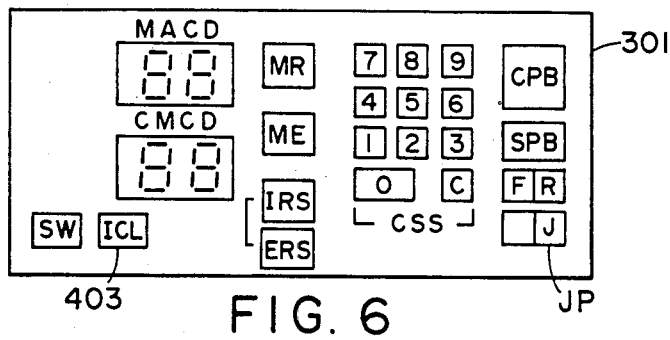
FIG. 6
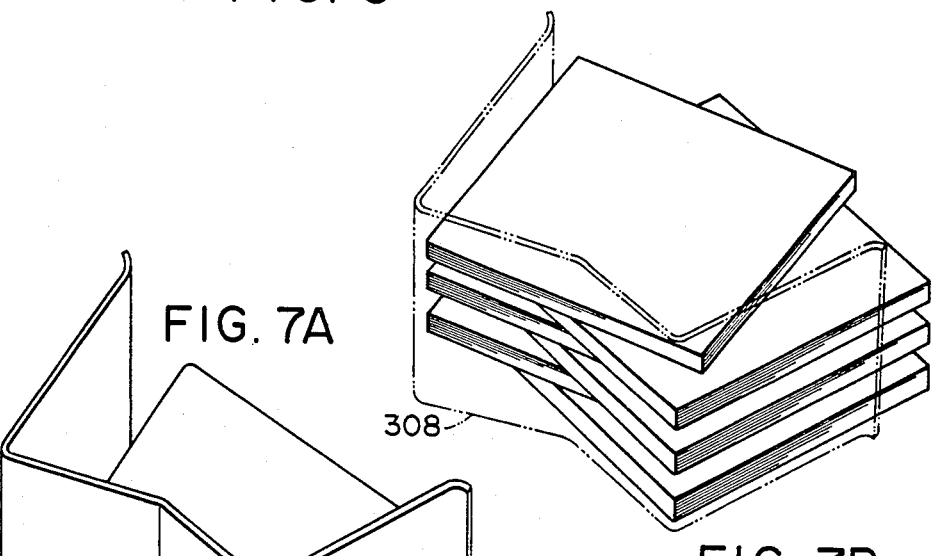
FIG. 7A
FIG. 7B
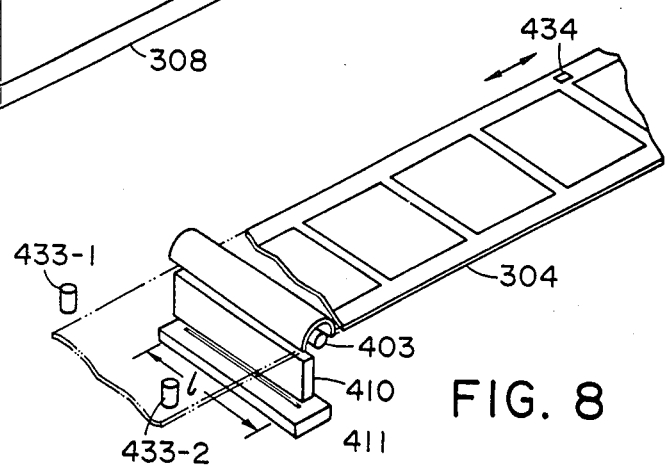
FIG. 8

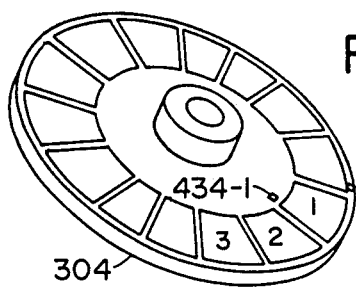
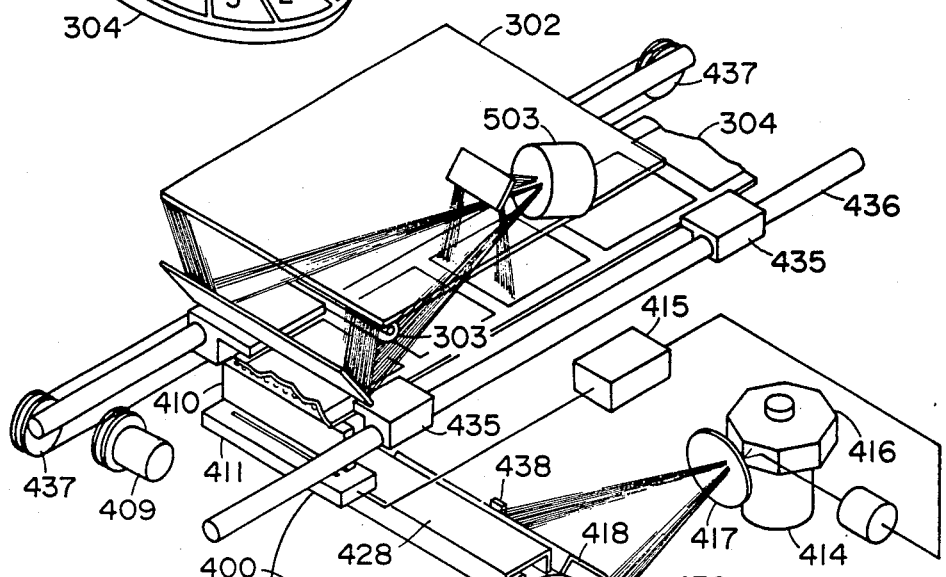
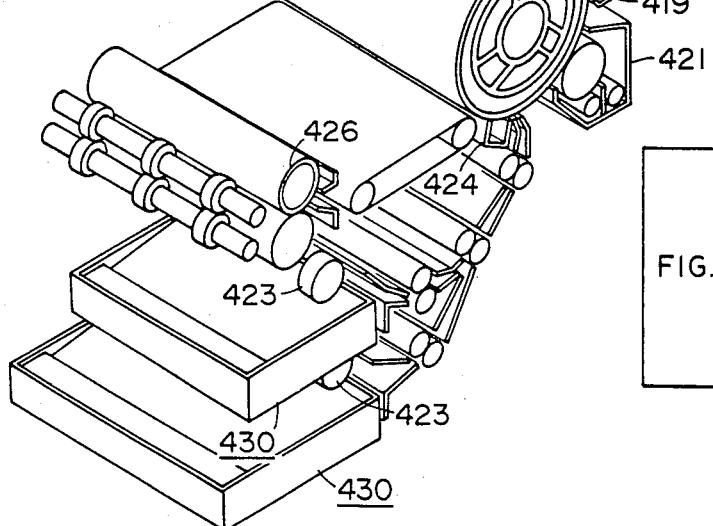
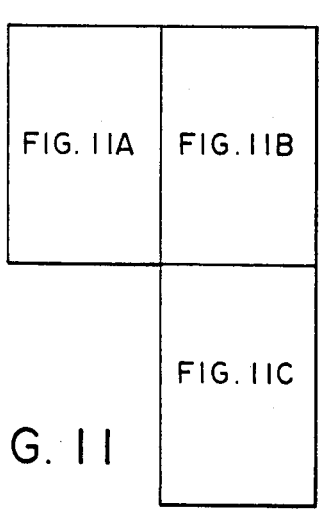

SYSTEM FOR STORAGE AND PRINTING A PLURALITY OF IMAGES

This application is a continuation of application Ser. No. 910,785 filed Sept. 23, 1986 now abandoned; which is a continuation of application Ser. No. 842,712 filed Mar. 19, 1986, now abandoned; which is a continuation of application Ser. No. 775,116 filed Sept. 12, 1985 now abandoned; which is a continuation of application Ser. No. 706,974 filed Mar. 1, 1985, now abandoned; which is a continuation of application Ser. No. 586,646 filed Mar. 7, 1984, which issued as U.S. Pat. No. 4,505,576 on Mar. 19, 1985; which is a continuation of application Ser. No. 390,025 filed June 18, 1982, now abandoned; which is a continuation of application Ser. No. 201,537 filed Oct. 28, 1980, now abandoned.

BACKGROUND OF THE INVENTION

1. Field of the Invention

This invention relates to an automatic copying method and apparatus. More partcularly, it relates to a copying machine having an electronic sorter function. See U.S. Pat. Nos. 4,054,380 and 3,829,083.

Along with the recent tendency of copying machines toward compactness, high speed and multi-function, automatic document treating devices have come into wide use which not only enable production of the same copies of an original document but also have the automatic book-binding function such as automatic document feeder (hereinafter referred to as (ADF) and automatic page arrangement (hereinafter referred to as sorter).

2. Description of the Prior Art

Most of the conventional copying machines are of the type as shown in FIGS. 1 and 2 of the accompanying drawings in which an electrophotographic copying machine 8 is additionally provided with an ADF mechanism.

Briefly describing FIG. 1, a lowermost one of sheet originals is fed from a tray 2 containing therein a stock of sheet originals 1 by a roller 3 through a transport belt 4 onto an original carriage 5. After the fed original is fixedly set on the original carriage, the copying operation is effected through the well-known process of the electrophotographic copying machine wherein the optical system is reciprocated and the original is subjected to the slit exposure. After the completion of the copying, the original is transported by the now reversely moving transport belt 4 and discharged into a discharge tray 7 by a pawl 6. Thereafter, by repeating the same operation, a volume of printed matters having pages arranged in good order may be automatically prepared. However, in order to prepare a second volume of copies, the originals in the tray 7 must be manually returned into the tray 2 and this means complexity of handling of the originals and moreover, the operator must stay with the copying machine throughout the copying operation.

In the apparatus of FIG. 2, the lowermost one of the sheet orginals is fed from a tray 8 to a first transport roller 10 by a roller 9 and transported onto an original carriage by rollers 11 and 12 and fixedly set thereon. The copying operation is effected with that original being illuminated. After the completion of the copying, the roller 12 is operated to discharge the original from the original carriage, and the original is again set in the tray 8 by a roller 13. By repeating the same operation, a plurality of volumes of printed matters having pages well arranged are prepared.

However, where the number of volumes to be bound is great, the frequency with which the originals are set on the original carriage and discharged therefrom is also great and so, there are dangers of the precious originals being injured. There are also dangers that the originals are transported in overlapped condition and accordingly, a volume of copies having missing pages may be prepared.

There is another system whereby a necessary number of copies are obtained from one original and those copies are sorted into a necessary number of volumes by a sorter and such operation is repeated by replacing the original with new ones in succession. This system eliminates the need to set the original often and reduces the danger of injuring the originals, but where a great number of volumes are to be bound, the sorter must be on a larger scale and this means an increased mechanical space for temporarily storing the copies and moreover, a complicated sorting function.

When considering the operability, the former automatic document feeding system is restricted to sheet originals and cannot use book-type originals. On the other hand, in the latter sorter system, the operator must be attendant on the machine while turning the pages until the book binding is completed. This means waste of much time and labor to the operator.

Also, where the ADF is used, in order to enable only a desired one of multiple document originals to be copied, it has been necessary for the operator to be attendant on the machine at all times and to take that one original from among the multiple originals and have it copied. An attempt to automate this would possibly require a very huge system.

Still more, it has been very difficult to copy a desired number of non-adjacent documents in a desired order.

SUMMARY OF THE INVENTION

It is an object of the present invention to provide a copying method and apparatus which eliminate the above-noted disadvantages and facilitate the handling of documents.

It is another object of the present invention to provide a copying method and apparatus which enable a plurality of document images to be prestored in a memory and enable any one document image to be selected from the memory and copied.

It is still another object of the present invention to provide a copying method and apparatus which enable a plurality of document images to be pre-stored in a memory and enable the document images from a first desired page to a second desired page to be selected from the memory and copied.

It is yet another object of the present invention to provide a copying method and apparatus which enable a plurality of doument images to be pre-stored in a memory and thereafter enable any one or plural images to be selected from the memory and copied by any desired number.

It is a further object of the present invention to provide a copying method and apparatus which enable a plurality of document images to be pre-stored in a memory and enable any plural images to be selected from the memory and copied by any desired number in any desired order.

It is still a further object of the present invention to provide a copying method and apparatus which, simply by pre-actuating a manual key, enable any plural document images to be selected from a memory and copied by any desired number and enable stand-by to be provided so that any further plural document images can be copied again.

It is yet still a further object of the present invention to provide a copying apparatus which enables partial copying of document images stored in a memory without the necessity of the operator being attendant on the machine at all times.

BRIEF DESCRIPTION OF THE DRAWINGS

The above and other objects of the present invention will become fully apparent from the following detailed description of the embodiments of the invention taken in conjunction with the accompanying drawings, in which:

FIG. 4 is a cross-sectional view of an embodiment of the copying apparatus according to the present invention;

FIG. 6 is a top plan view of the operating unit of the copying apparatus shown in FIG. 4;

FIGS. 7A and 7B are perspective views showing examples of the tray in the copying apparatus of the present invention;

FIG. 8 is a perspective view of the CCD in the copying apparatus of the present invention;

FIG. 9 is a perspective view showing an example of the memory;

FIG. 10 is a perspective view showing an example of the copying apparatus according to the present invention;

DESCRIPTION OF THE PREFERRED EMBODIMENTS

Figure 1:
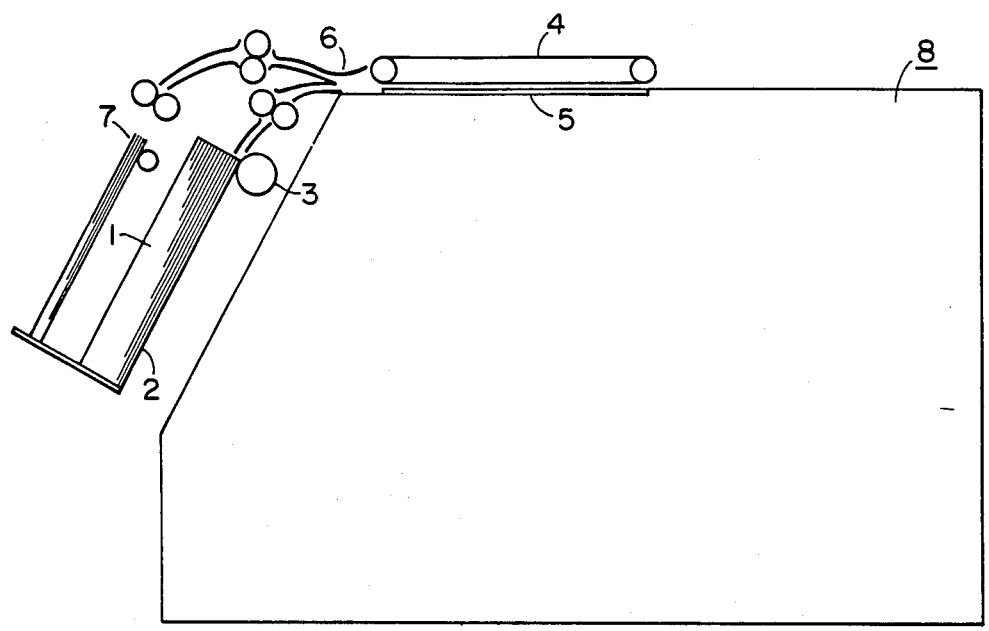
FIGS. 1 and 2 are schematic views of the copying apparatus according to the prior art.
Figure 2:
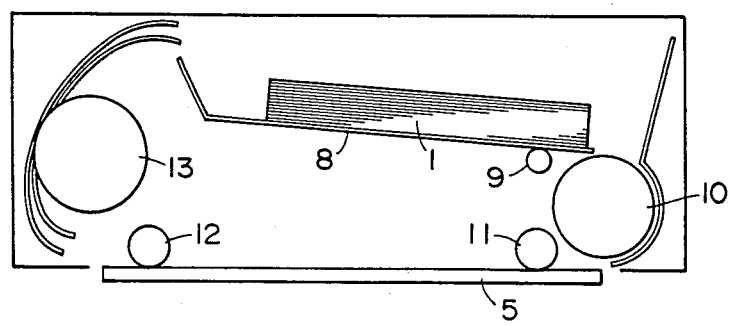
Figure 3:
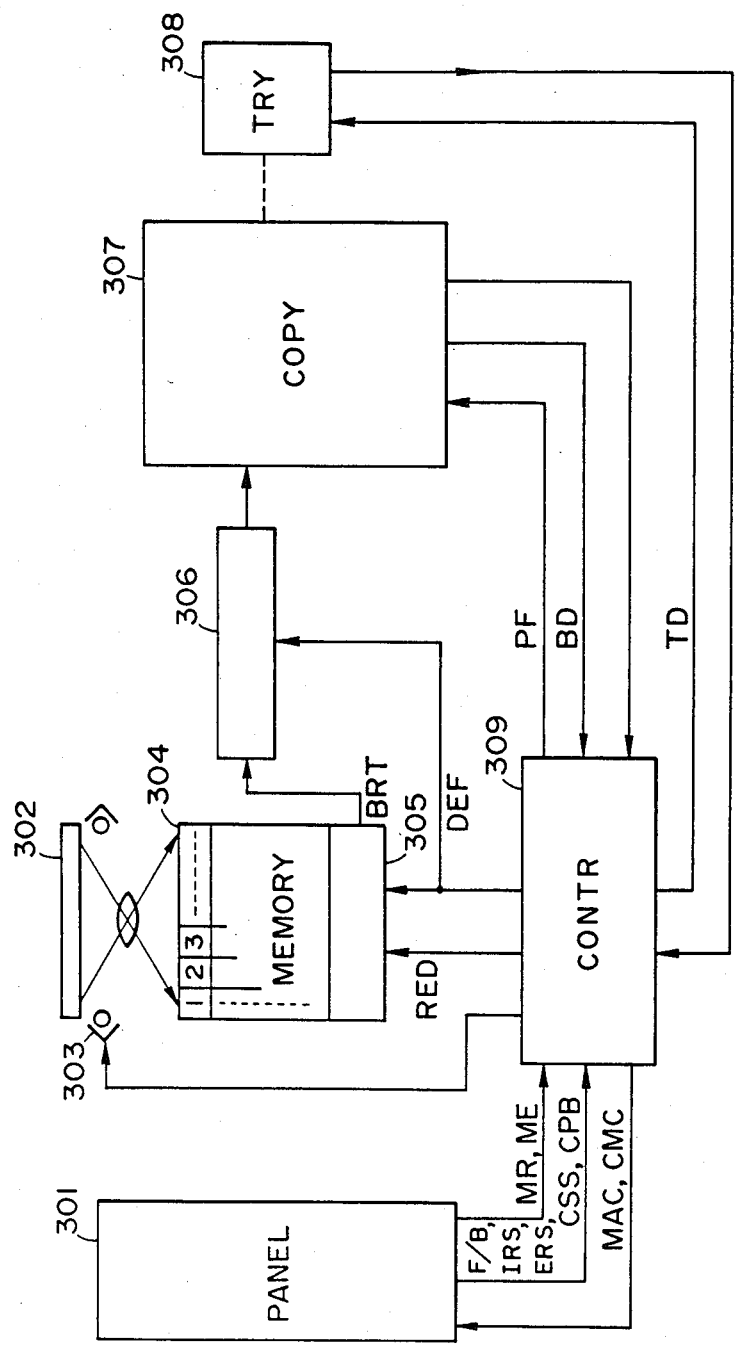
FIG. 3 is a schematic block diagram showing an example of the copying method and apparatus according to the present invention.

FIG. 3 is a control block diagram showing an embodiment of the copying apparatus to which the present invention is applied. FIG. 3 includes an operating panel 301 for entering a copy start or like instruction and for indicating the number of volumes, an original carriage 302 for supporting thereon originals or articles to be copied, a light source 303 for illuminating the original, and a light image memory 304 for temporarily storing the image of the original using liquid crystal, electrochromy or PLZT (a compound of lead, lanthanum, zirconium and titanium which is fully described in the journal *Television* Vol. 29, No. 8). Designated by 305 is a read-out unit including a photoelectric converter for scanning the image memory 304 and reading out image signals. By this, image signals may be converted into time-serial electrical signals. Denoted by 306 is a transducer for converting the time-serial electrical signals into time-serial light signals. The transducer 306 may comprise, for example, a laser light source and a driver circuit for the light source (including a modulation and deflection circuit). Designated by 308 is a tray for containing copies produced by a copying apparatus 307. When copies of a volume are contained therein, the tray 308 slides at a good time to leave off and puts an end for each volume. Designated by 309 is a control for optimally effecting the above-described operations. MR, ME, CSS and CPB respectively are a signal for causing the memory 304 to start its storing operation, a signal for stopping the storing operation of the memory 304 to make copying possible, a number signal indicative of the number of volumes, and a signal instructing print start. These signals are entered by the key switches of FIG. 6. MAC and CMC respectively are signals for indicating on the panel the number of images stored by the memory 304 and the number of volumes. IEX is a signal for controlling the turn-on of the lamp 303 for causing the memory 304 to store the images. PF is a signal for operating a roller in the copier 307 for feeding paper from a cassette. RED is a signal for controlling the operation of the converter 305. BRT is a signal for intensity-modulating the laser beam. DEF is a signal for deflecting the laser beam. BD is a signal for detecting the arrival of a beam spot at the end of a photosensitive medium and for controlling the read-out from the memory. TD is a signal for slidingly moving the tray 308 which receives paper having images transferred thereto.

FIG. 6 shows an example of the operating panel. MR is a read-in switch for writing image information into the memory, ME is a memory end switch for indicating the end of the writing-in, CPB is a read-out record start switch, CSS is a setter for setting the number of recorded volumes through the numeral keys, MACD is an indicator for indicating the stored number of memory areas, and CMCD is an indicator for indicating the set number by the CSS. All these adopt the segment display system.

In the foregoing block diagram, for example, when five copies of page 1 to page 10 of a book original are to be produced and arranged in the order of page numbers, if the memory switch MR on the operating panel 301 (details of which are shown in FIG. 6) is depressed with the first page of the book original supported on the original carriage 302, the first page of the book original is illuminated by the lamp 303 and stored in the area 1 of the image memory 304 (the areas will hereinafter be referred to as pages or segments). Next, if the memory switch MR is again depressed with the second page of the book original supported on the original carriage, the image information of the second page is stored in the memory area 2 of the memory. Likewise, the original images up to the tenth page are stored in the image memory. By the number set key CSS of the panel 301, the number of required volumes is stored in another memory (register). Thereafter, upon turn-on of the start switch CPB, read-out of the image signals from the memory area 1 is started and the light signals so read out are converted into electrical signals, and the time-serial electrical signals are converted into beam signals of the laser light by the transducer 306. The laser light is intensity-modulated. The photosensitive medium of the electrophotographic copying machine is exposed to the resultant modulation beam to form an electrostatic latent image, which is later developed. Thus, the recording of the first page has been effected. After completion of the recording of the first page, the image memory area 2 is read out and the recording of the second page is likewise effected. The recording of up to the tenth page (a volume) is likewise terminated, whereupon, if a further volume is desired, the image memory may be returned to its initial position so that the memory areas 1, 2 and so on may be successively read out, thus accomplishing copying of page 1 to page 10 in the same manner as the first volume.

When a volume of print has been completed, means for sliding the tray 308, for example, a reversible motor, operates in response to a tray signal TD from the control 309 to move the tray 308. For example, the tray as shown in FIG. 7A is used. A cam plate 313 is moved to the right or to the left as indicated by the arrow by the reversible motor 310. In accordance with the movement of the cam plate, the tray 308 slides leftward or rightward about a shaft 312 with the aid of a cam 311. FIG. 7B shows six volumes of copies contained in the tray in the manner described above. The signal TD may be generated by detecting that the last paper of each volume has been discharged from the copier.

An embodiment of the present invention will now be described fully. FIG. 4 is a schematic cross-sectional view of a copying machine using as the memory 304 a complex element including liquid crystal. The copying machine includes an original carriage 302, a light source 303 for illuminating the original, a drum 400 having a photosensitive medium on the peripheral surface thereof, a light source 403 for reading out the original image in the memory, transparent electrodes 405, 408, a photoconductive layer 406, liquid crystal 407, a rectangular planar image memory 405–408 movable in the direction of the x-axis, a pulse motor 409 for effecting the movement of the image memory in the direction of the x-axis, a lens system 410, a photodetector 411 for converting into an electrical signal the stored image formed through the lens 410, a video amplifier 412 for amplifying the output of the photodetector 411, a laser 415, a well-known deflecting mirror 416 for scanning the laser beam in the axial direction of the photosensitive drum 400, a deflection driver 414 for deflecting the laser beam from the laser 415, a well-known F-θ lens 417 for correcting the light path by scanning, a primary charger 418 for charging the photosensitive drum 400 to the positive polarity, a charger 419 for AC-charging the drum 400 simultaneously with the exposure to the laser beam, a whole surface exposure lamp 420, a developing device 421, transfer paper 422, a pick-up roller 423 for feeding paper 422 from a container 430, an image transfer charger 424, a roller 426 for fixing transferred image, a tray 308 as described for receiving discharged transfer paper, a blade 428 for cleaning the photosensitive drum 400 to make it ready for reuse, a circuit 429 for driving the pick-up roller 423, and an operating panel 301 as already described. The lamps 303 and 403 operate in response to the write-in signal WS and read-out/clear signal from the controller 309. The liquid crystal 407 comprises a mixture of 5% cholesteric liquid crystal and nematic liquid crystal and having an image memory characteristic of the order of two hours. Designated by 508 is a power source for causing the memory 407 to store images. The power source 508 generates a voltage of several volts having a sinusoidal wave or a square wave of a frequency of several kilohertz. Denoted by 509 is a memory clearing power source for generating a voltage of a sinusoidal wave or a square wave of several tens to several hundred kilohertz. The power sources 508 and 509 apply the voltages to the memory through electrodes 405 and 408.

Denoted by 510 and 511 are switches for writing in and clearing. These switches are closed in response to the write-in signal WS and the clear signal ERS from the control unit 309. Designated by 433-1 is a switch for detecting the initial position of the memory 304 and stopping the movement of the memory. This switch is closed by optically detecting a mark provided, for example, on the non-image portion of the memory. Denoted by 433-2 is an optical switch for likewise detecting the terminal end of the memory. The detector 411 is a solid state line scanner called CCD (Charge Coupled Device). This detector is provided so as to be capable of detecting an image extending by one bit (one picture element) in the x-axis direction and by the width of the original in the y-axis direction. The photoconductive layer 406 uses OPC (organic semiconductor photoconductive layer). By this, the transmission of light can be enhanced.

FIG. 8 shows an example of the CCD. In the Figure, 1 represents the length of the CCD 411. For example, the CCD 121 produced by the Fairchild Semiconductor Corporation has a length of l of 26 mm and has 1728 bits in the y-direction. That is, it has 65 bits of image elements per millimeter. Incidentally, 10 bits of image elements per millimeter can be said to have a sufficient resolving power to the human eye, so the image formed on the CCD 411 is reduced to 1/6.5 relative to the original image on the platen 302. On the CCD 411, the width of the stored image of the memory 304 may be formed at 1× magnification through a known optical element array 410. Therefore, since the resolving power of the liquid crystal is more than 40 bits per millimeter, the CCD can read out the image without hampering the resolving power. Also, since the width of the memory 304 can be 26 mm which is equal to the length l of the CCD, the memory can be made very small. Incidentally, the image portion of an A4 size book original (290 mm×210 mm) is usually 250 mm×170 mm, and therefore, if this is reduced to 1/6.5, the width substantially becomes 26 mm which can be stored in the aforementioned memory. Thus, the length of the memory which can store 10 pages of the original is substantially 400 mm with the space as 1 mm.

If the memory 304 is made into the form of a disc as shown in FIG. 9 and memory areas 1, 2, 3 are arranged about the disc, the memory can store multiple pages and can be made compact. Incidentally, a disc of about 300 mm diameter can store 20 pages. Designated by 434-1 on the memory plate is a mark for detecting the initial position of the memory by means of the switch element 433-1, and 434-2 is a mark for detecting the memory end by means of the switch element 433-2.

FIG. 10 is a perspective view of an example of the copying apparatus which corresponds to the apparatus shown in FIG. 4. A well-known polygon mirror may be used as the deflecting mirror 416 and is rotated by a motor 414 so that the photosensitive drum 400 may be scanned with a reflected beam. Denoted by 438 is a beam detector which develops a signal BD (FIG. 3). If the beam detector 439 is provided at the left end of the drum, the error of the time for restarting the y-direction scan will be decreased. In order to reduce the original image on the platen 302 to 1/6.5 and to cause the memory 304 to store it without enlarging the size of the apparatus, the light path as shown may be adopted. In this case, the slit exposure is effected to form an image in the memory while the platen 302 and memory 304 are moved with a velocity difference corresponding to the ratio of reduction. Read-out lamp 403 and detector switches 433-1 and 433-2 are disposed so as not to interfere with the memory movement, as shown in FIG. 8.

The memory area may be changed during the write-in time or during the clear time by the pulse motor 409 or the memory may be bit-moved in the x-direction during the read-out time.

The number of pulses for driving the pulse motor may determine an extent of the area and bit movements. The forward revolution of the motor causes the memory to move rightward in the direction of the x-axis, and the reverse revolution causes leftward movement. Designated by 435 is a support member for supporting the memory and for making the memory movable along a guide rail 436. Denoted by 437 is a pulley for moving the support member 435 by the pulse motor 409. It is also possible to provide the pulse motor with a pinion gear and provide the memory with a rack gear to thereby move the memory in a pinion-rack fashion. Where a disc memory is used, it is parallel-moved to the write-in portion and the read-out portion before the initiation of the respective processes, it is rotated during the clear and segment movement, and it is parallel-bit-moved during the scan write-in and the read-out.

Describing the operation, the original document on the original carriage 303 is illuminated by the light from the exposure light source 303 and a reflected image is formed on the memory by the lens system 503. When the reflected image is formed on the memory with the write-in switch 510 being closed, the resistance in the photoconductive layer is varied in accordance with the light and shade of the original so that the voltage applied to the liquid crystal 407 is varied. Accordingly, the light transmission of the liquid crystal is also varied in accordance with the original image. That is, the information on the original is temporarily stored in the complex memory comprising the liquid crystal and the photoconductive layer. The clearing may be performed by uniformly applying the light from the lamp 403 to the complex memory and closing the switch 511 to apply AC signals from the power source 509 to the memory.

Where the information stored in the memory is to be read out, when the memory is uniformly illuminated by the light source 403, a transmitted image having light and shade corresponding to the information is formed on the photodetector (CCD) 411 by the lens system 410 because the light transmission of the memory differs in accordance with the memory information.

The CCD 411 serially produces a voltage corresponding to the light and shade by its self-scanning. The beam from the laser source 415 is intensity-modulated with that voltage.

If the scanning rate in y direction of CCD 411 is equal to that of polygon mirror 416, the beam may directly be modulated with the output of the CCD. If not, the output from the CCD may be stored into the buffer memory, from which the output is read out in synchronism with the scanning of mirror 416. The controller 309 is a system including a well-known computer, as will further be described, and has registers for setting and counting the page memory number and registers for counting the number of volumes set. These are shown in Table 1 below.

TABLE 1

| Registers | Functions |
|---|---|
| SBC | a register in which the total number of scans |

TABLE 1-continued

| Registers | Functions |
|---|---|
|  | in x-direction per segement of CCD is preset |
| SBR | a register for counting the number of scans of CCD in x-direction and for storing such count |
| MAC | a register for counting the number of pages stored in the memory and for storing such count and causing an indicator MACD to indicate that count |
| MAR | a register for counting the number of pages read out from the memory and storing such count |
| CMC | a register for storing the number of volumes set and causing an indicator CMCD to indicate that number |
| CMR | a register for counting the number of volumes and for storing such number |

Figure 5A:
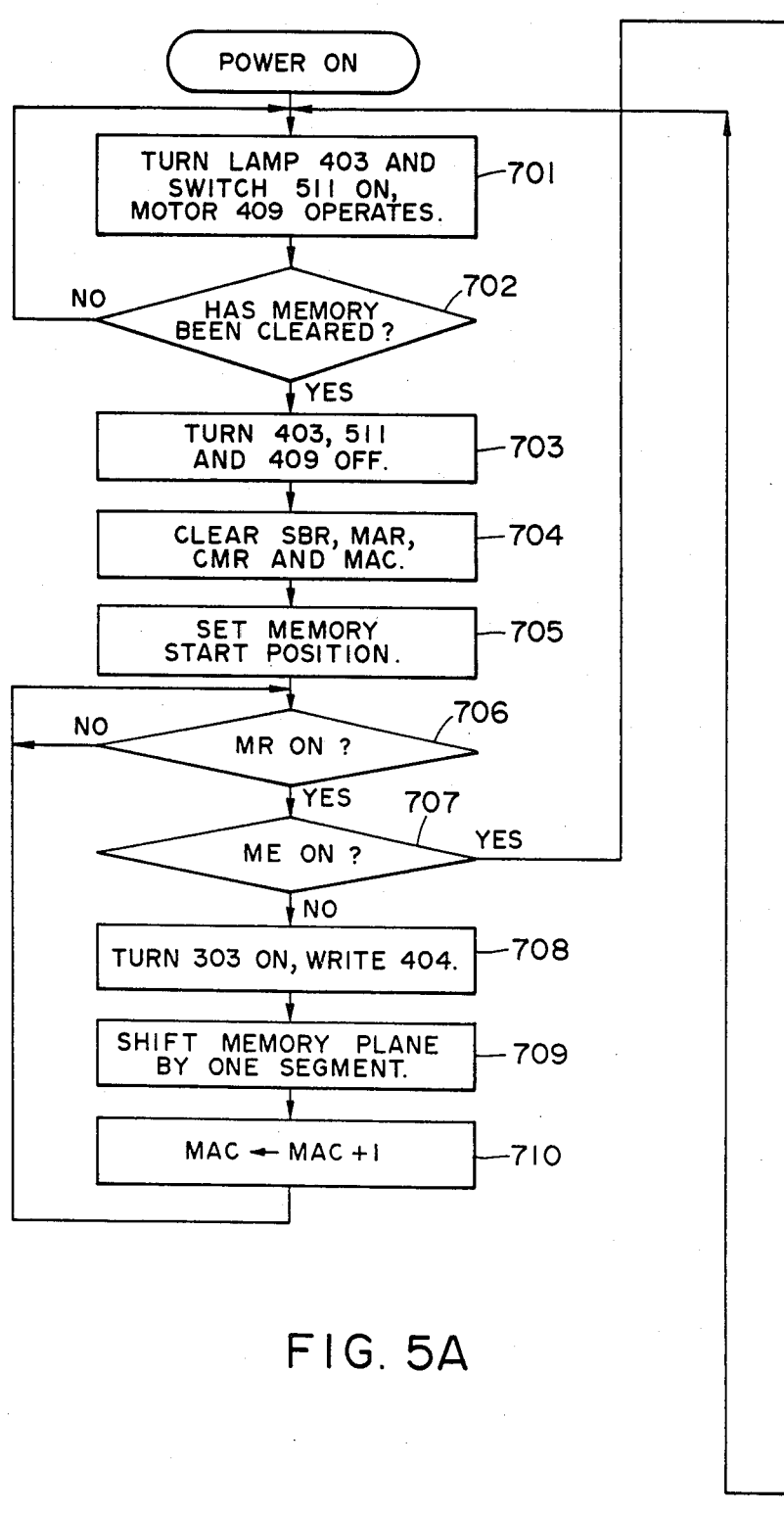
FIGS. 5A and 5B, when combined as shown in FIG. 5 and FIGS. 13A, 13B and 13C, when combined as shown in FIG. 13, are control flow charts of the apparatus shown in FIG. 4.

Reference is now had to the sequence control flow chart of FIGS. 5A and B along with FIG. 4 to fully describe the control operation effected by the controller 309. After the main switch has been closed and after the heater of the fixing device 426 has reached a predetermined temperature, the switch 511 for the read-out light source 403 and the memory clearing power source 509 is closed and the pulse motor 409 is energized to move the memory while clearing all the content of the memory (step 701). This operation may take place immediately after the closing of the main switch. When the memory has been cleared by moving from end to end, means for clearing is turned off by a memory end detecting switch 433-2 (step 702). After the lamp 403, the power source switch 511 and the motor 409 are rendered to OFF condition upon completion of the memory clear, the scan counting register SBR, the page memory area counting register MAR, the volume number counting register CMR and the indicator driving registers MAC and CMC in the control circuit 413 are all cleared (steps 701-704). Thereafter, the memory is set back to the memory start position (step 705). That is, the pulse motor rotates in a reverse direction until the switch 433-1 senses the start mark. This makes the image memory ready to write in.

When the first page of the original is set on the original carriage 302 and the memory switch MR on the panel is closed, the exposure light source 302 is turned on in the fashion of flash to form the image of the original on the memory. When the power source 508 is operated simultaneously therewith, the image information is recorded on the liquid crystal 407 (step 708).

As an alternative method of causing the memory to store the image, the original carriage or the lamp and the optical system lens may be moved to subject the original to the slit exposure. After completion of the storing, the lamp 303 and the power source 508 are rendered to their OFF conditions and the memory plate is shifted to the right by one segment by the pulse motor 409 and +1 is effected in the storage register MAC. Whether the memory switch has been closed is determined (step 706). In a similar manner, a required number of originals are successively stored in the memory. After each page of the original has been stored, and when the memory end switch ME is closed, the sequence flow advances to step 711, thus making it possible to set other information. Here, the number of volumes required is set by the number key CSS and stored in the register CMC.

READ-OUT AND PRINT

Next, when the start switch CPB is closed (step 712), read-out of the memory and recording operation are started.

The y-axis direction of the memory is read by CCD 411 through the self-scanning effected by external clock pulse (not shown) of CCD 411. The x-axis direction is scanned by the movement of the memory plate by the pulse motor 409 and read by one bit of CCD 411. In brief, reading of one line is effected by CCD 411. Also, the end of each segment of the memory may be optically detected by a position detecting hole (not shown) provided in the memory and accurately adjusted in position.

When the reading and recording are started, the page register SBR is first reset to zero. Then, the end of the memory area 1 is set to the read-out position (step 714). This is accomplished by further providing a light switch in the read-out portion to energize the motor until the mark 434-1 is sensed. At this time, the chargers 418, 419, the lamp 420 and the developing device 421 operate to initiate the execution of the known electrophotographic process (step 715). After the surface of the photosensitive medium charged by the charger 418 has passed by the surface of the charger 418, the memory read-out light source 403 is turned on to effect the first scanning in the y-axis direction. The pick-up roller 423 is also operated to feed a sheet of transfer paper (step 716). The image formed on the CCD 411 is taken into the CCD memory (step 717), and the CCD is caused to scan in the y-direction in synchronism with the operation of the laser scanner 414 for effecting the scanning in the widthwise direction of the photosensitive medium (from left to right) (step 718).

The time-serial electrical signals so taken in are applied from the CCD through an amplifier 412 to a semiconductor laser 415 and the intensity of the laser is modulated in accordance with the magnitude of the taken-in signals. The laser light carrying the image information is deflected in synchronism with the y-direction scanning of the CCD and applied to the surface of the rotating photosensitive drum through the F-$\theta$ lens. When the first scanning in the y-axis direction is terminated, the laser beam is caused to be incident on a fixed beam detector provided at the end of the width of the photosensitive drum surface. By the detection of such incident light, the y-axis scanning of the CCD is ceased and changed over to the next y-axis scanning (step 719). Thus, when the detector effects its detecting operation, the pulse motor 409 is driven by one step and the memory shifts by one bit in the x-axis direction (step 720). Then, the contents of the register SBR are incremented by one, and the paper feed roller 423 is rendered to its OFF condition (step 721). Incidentally, the register SBC prestores the number of scannings (i.e. resolution) in the x-axis direction for one segement of the memory. For example, the scanning number is 2970 in the case of an A4 size sheet. Therefore, when the number in the register SBC is coincident with the previous number in the register SBR, the scanning for one segment is completed (step 722). Since only one bit shift has been effected, the sequences return to step 717 and the scanning in the y-axis direction starts again from the initial position, and the information on the image formed on the CCD 411 is taken into the CCD 411 and the information on the second line is likewise recorded on the photosensitive drum in synchronism with the laser scanner 414.

Such operation is repeated until the maximum number of scannings determined by the register SBC is completed, whereupon the step progresses to the next page read-out print step.

On the other hand, the photosensitive drum 400 is exposed to the laser beam simultaneously with the AC charging by the charger 419 and the whole of the exposed surface thereof is illuminated by the lamp 420 to form thereon an electrostatic latent image of high contrast. This latent image is developed into a visible image with the toner of the developing device 421. The developed image is transferred onto recording paper 422 by the charger 424, the recording paper 422 being fed by the roller 423, whereafter the recording paper having the transferred image is fixed by the fixing device 426 and discharged into the tray 427. Thus, a single-sheet copy of the first page of the first volume has been obtained.

Subsequently, the step motor 409 operates to shift the memory plate and the next memory segment is moved to the memory read-out portion (step 723). Then, the contents of the register MAR are incremented by one (step 724), and the aforementioned x-axis direction scanning count register SBR is reset to zero (step 725). Each time the read-out of one area is terminated, the count register MAR and the memory register MAC are compared with each other (step 726) and when they are not coincident, namely, when the recording of the whole memory has not been completed, the next memory segment is read out (step 716). In the same manner as the first page, the recording of the second page is completed through the feeding of the recording paper, the memory read-out and the latent image formation. Likewise, thereafter, the recording of the number of pages stored in the indicator register MAC is continued to thereby complete the recording of one volume. At this time, the tray signal TD may be produced to slide the tray as aforesaid to form an end to the volume.

The memory movement by the pulse motor and the rotation of the photosensitive drum 400 are in synchronism with each other. That is, the drum and the pulse motor are in synchronism with each other so that the time required from after the laser beam has effected one line scan until it initiates the next one line scan is equal to the time required to move the memory by one bit in the x-direction.

Thereafter, an increment is effected in the volume number counting register CMR (step 727). The desired number of volumes is stored in the memory CMC which causes the number indicator CMCD to indicate the number, so whether or not the number is coincident with the number stored in the counter register CMR is judged (step 728). When they are not coincident, the step 713 is executed to reverse motor 409 to return the image memory to its initial position (step 714), and the read-out from the memory area 1 is again effected to continue the recording. Likewise, thereafter, the recording operation is effected for the required number of volumes set by the indicator CMCD, whereafter the operation is stopped (step 729). At this time, the image information stored in the memory is also cleared (step 701).

In the present embodiment, in the tray 308, the printing is effected in the order from the bottom page or the initially read-out page, whereas the order of pages may be reversed if the read-out from the memory is reversed, namely, if the read-out and printing is effected in the order from the last page.

While description has been made with respect to an example in which a light memory is used as the image memory, it will be apparent that the use of a memory medium such as semiconductor memory, magnetic disc or magnetic tape also leads to the same effect as that described above.

Description has also been made with the electrophotographic method as an example of the recording system, but the use of the ink jet printer system in which an ink gun is controlled by the outputs from the CCD to print, the contrography system or the electrostatic recording system will lead to the same effect as that described above.

Also, the above-described control flow may be implemented by those skilled in the art by using a well-known computer system as the controller 309 and by the use of the program thereof, for example, the microcomputer system ($\mu$ COM4, etc.) and therefore, the details thereof need not be described.

Figure 11A:
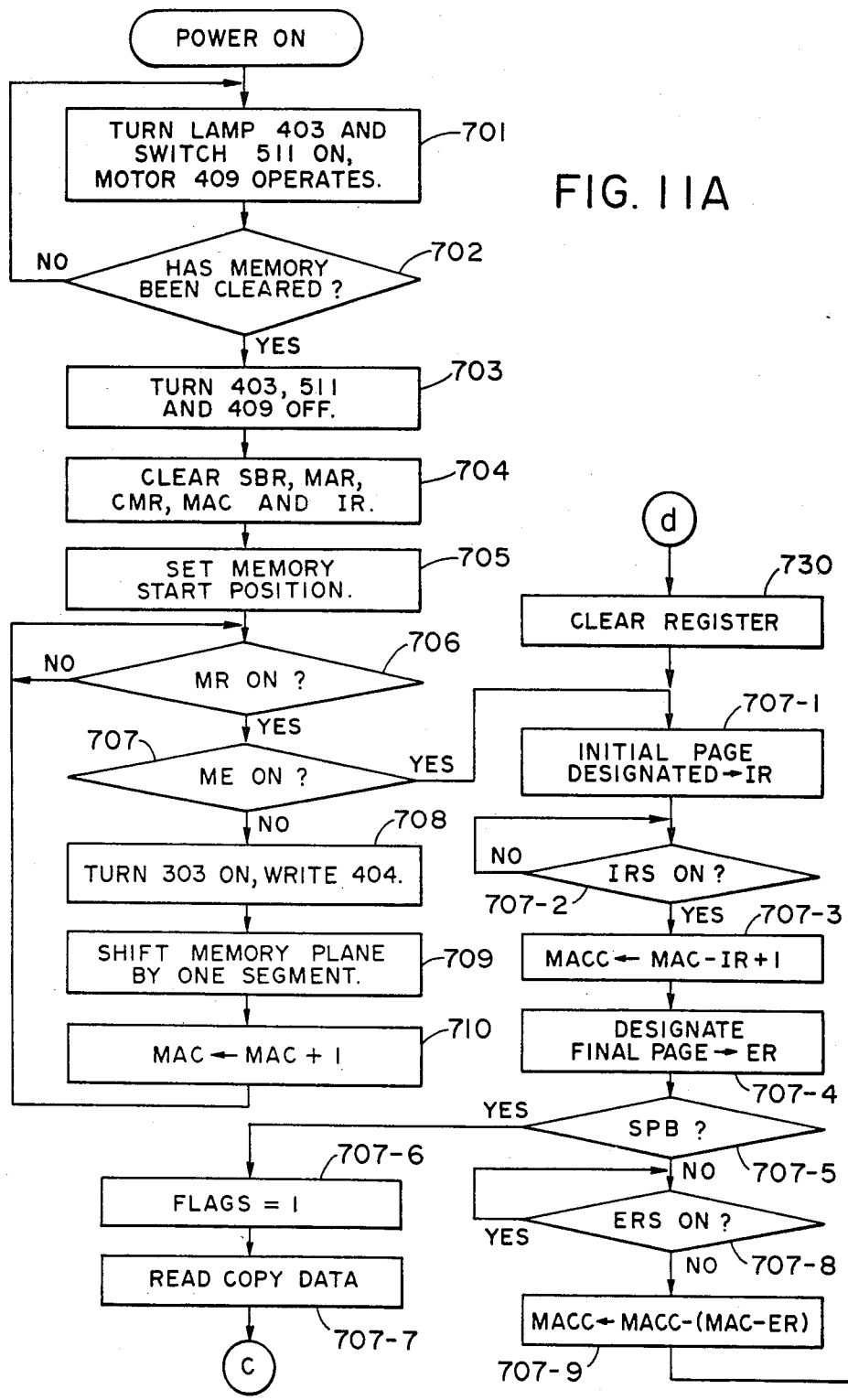
FIGS. 11A, 11B and 11C, when combined as shown in FIG. 11, and FIGS. 14 and 15A and 15B, when combined as shown in FIG. 15, are further control flow charts.
Figure 11B:
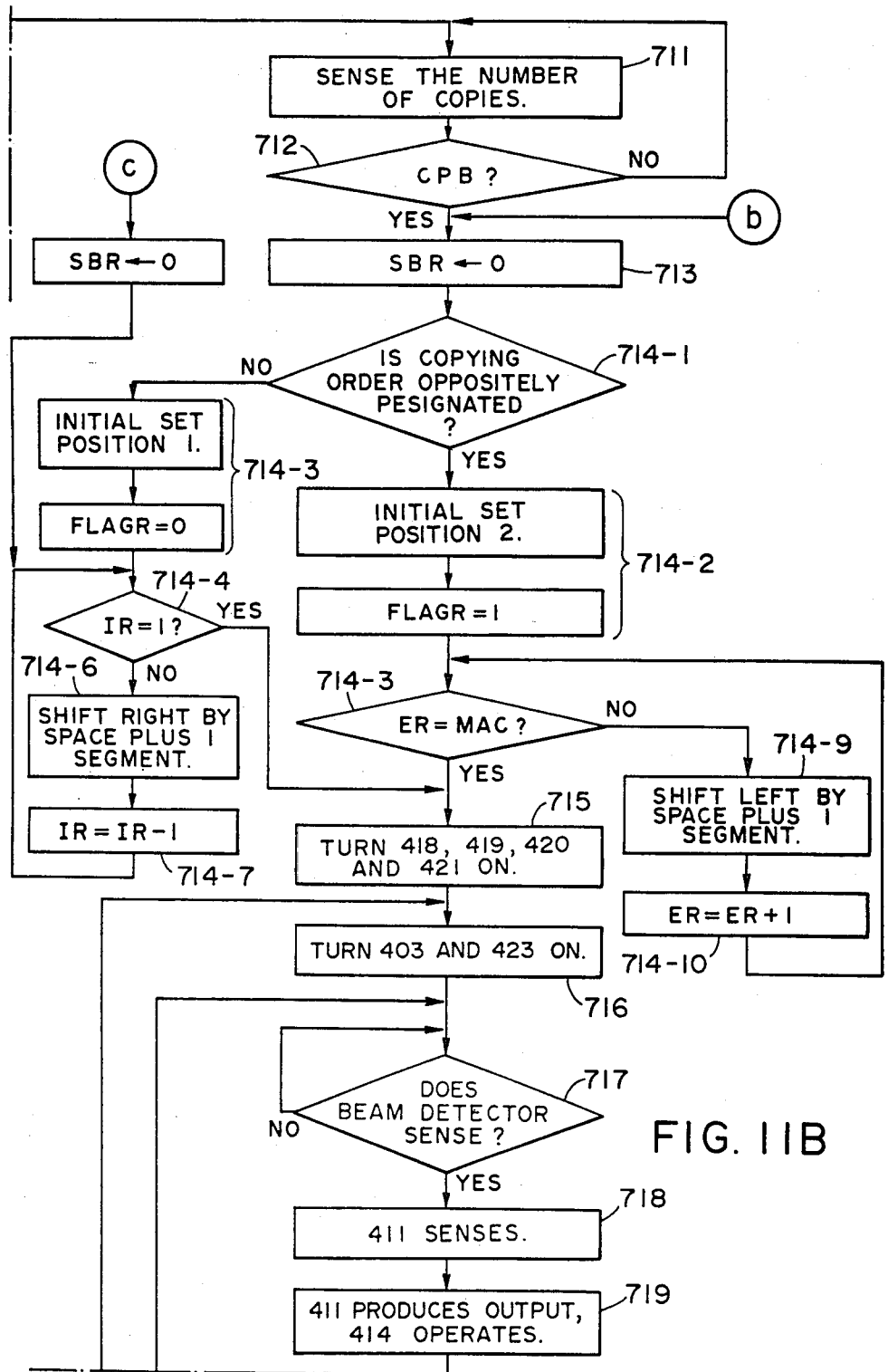
Figure 11C:
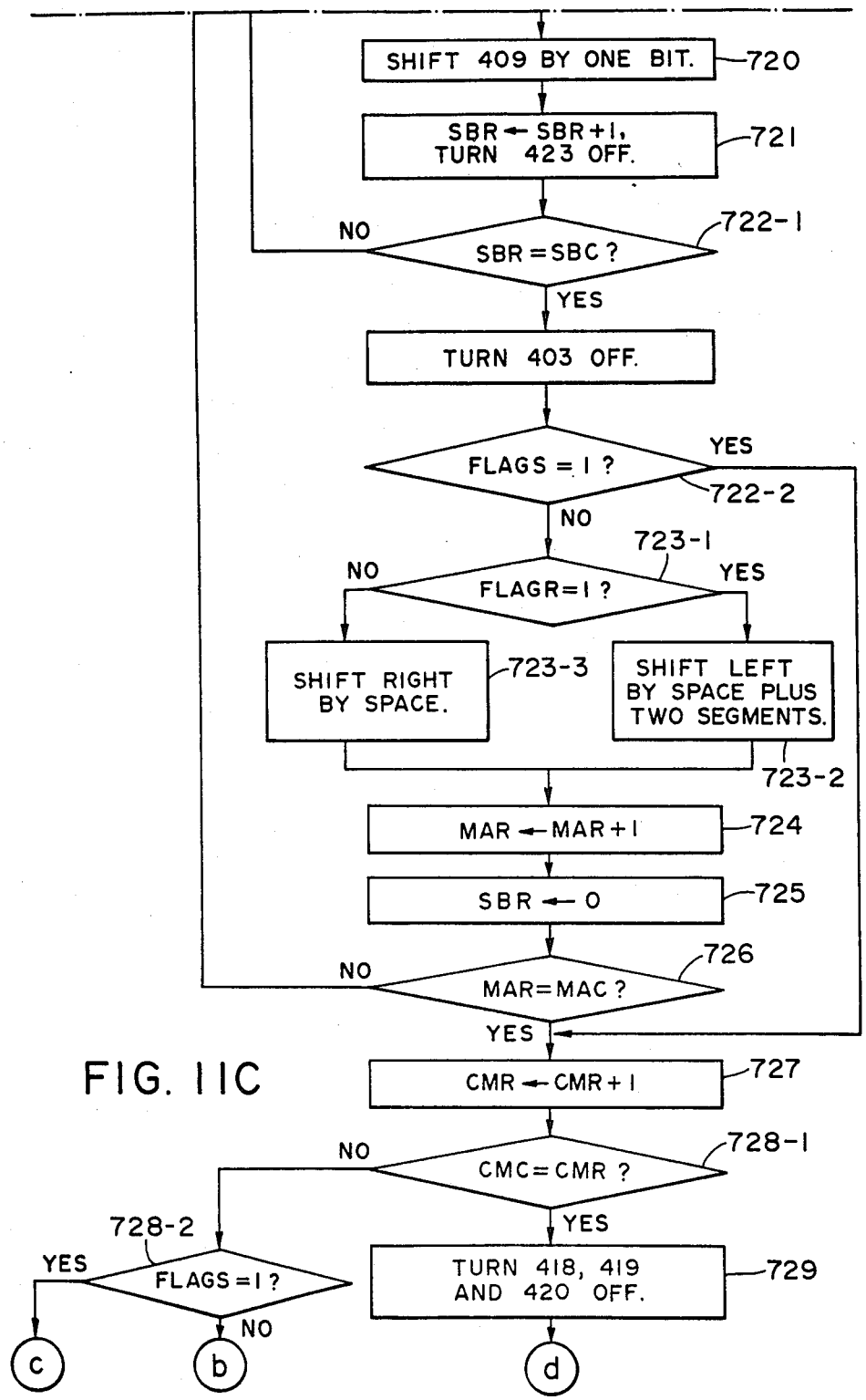

FIGS. 11A, 11B and 11C are a control flow chart in which (1) memory read-out and print is effected reversely from the order of memorization to produce copies of a desired number of volumes, or (2) to produce a single copy or multiple copies of any memory area, or (3) read-out and print from any memory area to another area is effected to produce copies of a desired number of volumes. A switch for selecting the forward and the reverse, a switch IR for designating any memory area and a switch SPB for copying only any area are provided on the panel 301. The copy modes are (1) the forward mode and the reverse mode, (2) the random single mode and (3) the random sorter mode.

Figure 5B:
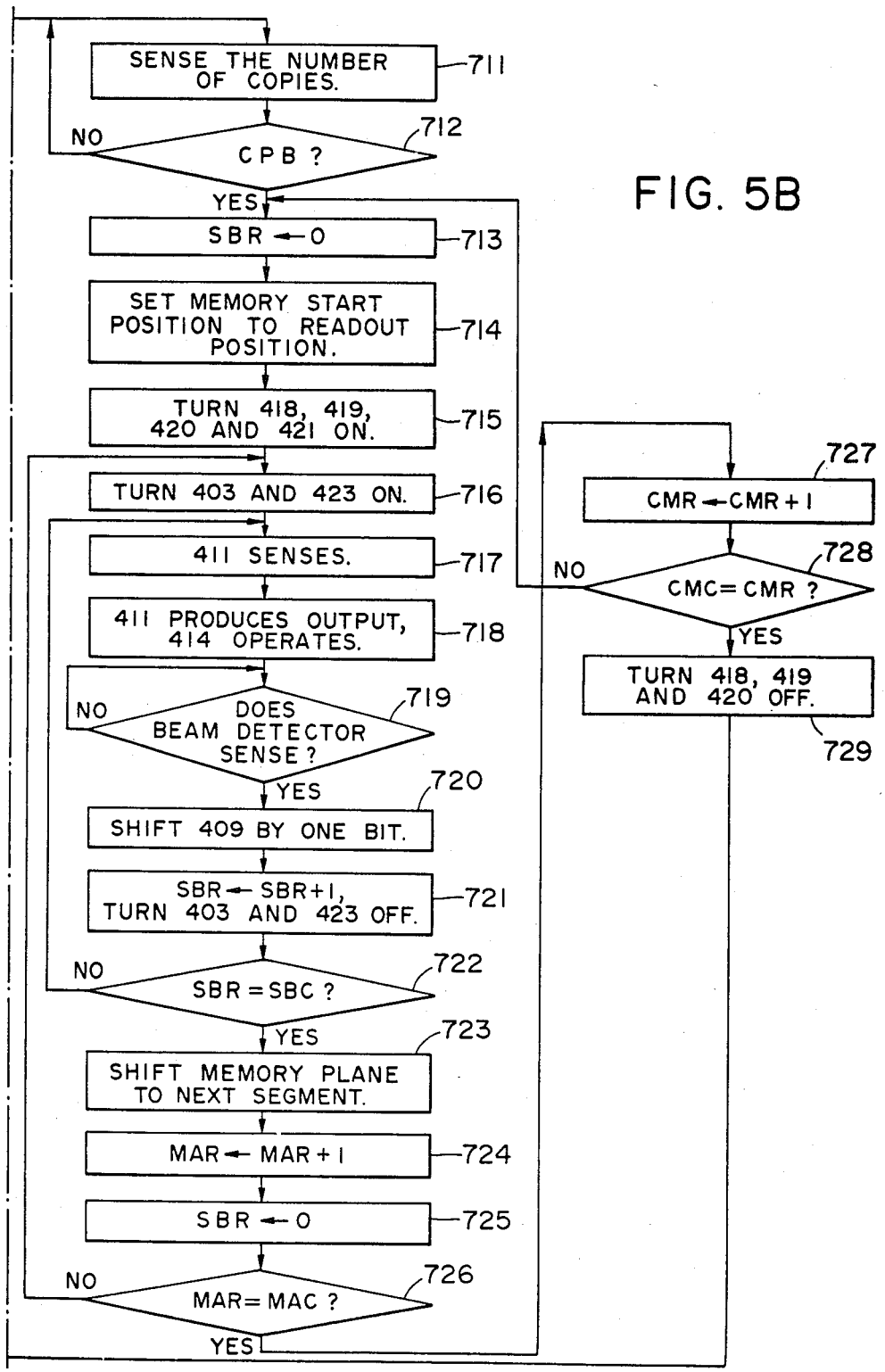

When memorization of the original image in the memory is completed in the manner described previously (step 707), the ten-keys CSS are closed to enter the area number into the register IR (step 707-1). Whether or not the switch IR has been closed is determined (step 702-2). When the switch IR has been closed, another register MACC is reset as shown in step 707-3. That is, the number in the register IR is subtracted from the register MAC and +1 is effected. This is stored in the register MACC. That is, the remaining area number is stored. Steps 707-4 to 707-9 will later be described. Whether or not the print button CPB has been depressed is judged (step 712), and subsequently, whether or not the switch F/R has been closed is determined (step 714-1). When these are in their ON conditions, the pulse motor is operated to print in the reverse direction and the memorization end position is set to the read-out position and a reverse flag FLAGR as a data indicating the reverse mode is set to another memory. When the print button and the switch F/R are in their OFF conditions, the memory start position is set to the read-out position in the manner as shown in step 714 of FIG. 5 to print in the forward direction and the flag FLAGR remains to be 0 (step 714-3). When it is judged in the forward mode that the number stored in the register IR and representing the initial address is 1, the step progresses to step 715 as shown in FIG. 5 (step 714-4), starting the read-out and print from the first (steps 715-721). Steps 722-1 and 722-2 will later be described.

In the reverse mode, read-out and print is started from the last memory page. When read-out of one page is terminated, the forward or the reverse of the mode is judged (step 723-1). When the reverse mode is determined, namely, when the flag FLAGR is 1, the memory is moved leftward by two segments by the pulse motor, and when the forward mode is determined, namely, when the flag FLAGR is reset, the memory is moved rightward by one segment (steps 723-2, 3). Steps 714-8 to 714-10 will later be described. Since now ER=-MAC, the program passes in the present embodiment. Also, where the mode is the reverse mode and the number stored in the volume number register is plural, when copying up to the first page of the memory is terminated, the program returns to step b (step 713) through step 728-1. Then, the copying is again started from the last page. In this manner, the reverse read-out and copying of one volume is executed and this is repeated as shown in FIG. 5 to complete copying of a desired number of volumes set by the ten-keys. By the direct operation of the ten-keys during the copying, change in the number of volumes and change in the number of next desired pages cannot be effected. Also, design can be made such that stand-by is provided at step 711 so that the volume copying interrupting input can be determined at step 13 to permit the change.

Assuming that the forward mode copying is to be effected from the second page, the number "2" is initially preset in the register IR (step 707-1). Then, the contents of the page register MAC are decremented by one (step 707-3). This is MACC. By step 714-1, 3, the memory is set to the memory start position (the left end) and FLAGR is reset. Then, it is judged in step 714 that the number in the register IR is not "1", and the memory is moved rightward by one segment (step 714-6), and a decrement is effected in the register IR (step 714-7). Then, the number in the register IR becomes "1", so that the step progresses to step 715, thus initiating the read-out and print from the second page by the previously described procedure. Since MACC has been decremented by one, the step again returns to step b just at the last page. Likewise, when copying is to be effected from the third page, the memory is idly moved by two segments, whereafter print is started and the step likewise return to step b at the last page.

In the case of the reverse mode, read-out and print is initiated from the last page by execution of steps 714-2 and 715. The number in the register MAC is corrected in accordance with the number in the register IR and therefore, when the second page is reached in step 726, "Yes" is judged and the volume count is incremented by one and the step returns to step b. Thus, copying is effected from the second page to the last page when in the forward direction, and copying is effected from the last page to the second page when in the reverse direction. That is, in any case, copies of a desired number of pages may be obtained. After copying of a desired volume has been completed or when the number of volumes to be copied is 1, the process means are rendered to their OFF conditions and the registers CMR, IR, MAR and MACC are cleared (step 730), thus providing stand-by. Also, as will later be described, the reverse mode copying can be effected from the number of pages stored by the use of the ERS key. After steps 714-4 and 714-8 have been executed, the initial number (by the key CSS) is set in the registers IR and ER. The segment shift in FIGS. 4 and 10 can be executed by counting the power source pulses of the pulse motor in the control unit 309 and deenergizing the motor. One segment movement is made possible by 2970+2 count. This is accomplished by storing in advance the pulse number in a read-only memory (ROM) or a random-access memory (RAM) so as to cause control 309 to put out the stored number of pulses to the motor. Alternatively, it is also accomplished by sensing driving pulses, which are counted in the computer by the stored number to deenergize the motor. The above technique may also be applied to the one-bit movement of the memory, and to an image memory position setting with a predetermined number of pulses therefor stored in an ROM or RAM.

Description will now be made of the print and reproduction of any page in the memory (the random mode and the random sorter mode).

In FIG. 6, SPB is a single key for producing a desired number of copies of only a desired page, and ERS is a key for copying from a page set by the IRS key to a page set by this key. When the ten-keys CSS are depressed after depression of the key SPB, the original image only of the page previously set by the IRS key and the ten-keys CSS is read out from the memory by the number of the ten-keys later depressed and is printed.

That is, as previously described, the number in the register IR is first subtracted from the number in the aforementioned register MAC and the result is stored in another register MACC. MACC is used in the case of volume print (step 707-3).

When the ten-keys CSS have been again depressed, the number thereof is stored in the register ER. The register ER shows any last page when continuous copying is desired.

However, when the single page key SPB is depressed after depression of the key IRS or after step 707-4, flag S is set to set the number of copies by the ten-keys and sense the input of the copy key CPB (steps 707-5 to 707-7). Then, the step jumps to routine ⓒ to set the initial position of the memory and the read-out area of the memory in the manner previously described (steps 714-4 to 714-7). After the position setting, that page is printed out by the previously described procedure. After completion of the print of one segment, the flag S is judged (step 722-2). Assuming that multiple copies of a desired single page are to be produced, steps 723 to 726 are not executed but the step proceeds to step 727 to increment register CMR. Thereafter, register CMC is compared with register CMR (step 728-1). When register CMR is not coincident with register CMC, the flag S is again judged and the step returns to the routine ⓒ, thereby effecting a control in which the same page is again read out from the first and printed. When the register CMR is coincident with the register CMC, the operation of the process means is stopped and the step returns to routine ⓓ, thus providing stand-by. When a similar key procedure is again effected, the memory image is not cancelled but a similar copy is produced. That is, when the ten-keys CSS, the IRS key and the copy key CPB are successively depressed, a copy of another desired page is produced. Also, when the ten-keys, the IRS key, the ten-keys and the copy key are successively depressed, multiple copies of another page are produced.

The ERS key of FIG. 6 is one for executing the copying of desired pages in the memory into a desired number of volumes with a well arranged page order. When the ten-keys CSS and the initial page key IRS are successively depressed, and then the ten-keys CSS and the last page key ERS are successively depressed and subsequently, the ten-keys CSS and the copy key CPB are successively depressed, then a number of copies between the number of the first ten-keys and the number of the second ten-keys can be repeated by the number of the third ten-keys. When the forward-reverse key F/R is depressed immediately after depression of the copy key, a desired number of copies of the pages in a well arranged page order can also be produced in the aforementioned reverse mode of copying.

That is, when the ERS key is depressed after depression of the IRS key and the ten-keys, the register MACC is corrected by the number stored in the register ER as in step 707-9, thus re-storing the numerical value. Upon the next depression of the ten-keys CSS and the copy key CPB, copying of a number of volumes is initiated. That is, the pages stored in the memory are ten pages and the copy range is two to nine pages, the number in the register MACC is eight.

When the switch FR is rendered into the forward direction after depression of the copy key, the memory page is shifted to right (the memory is shifted to left) until the contents of the register IR become 1 by the execution of the aforementioned steps 714-3 to 714-7. Thereafter, as already described, copying is automatically started from that page. Steps 715–726 are executed and when the copying of the ninth page (the copying of eight pages) is terminated, the count of the register MAR becomes coincident with that of the register MACC and therefore, the register CMR is incremented (step 727). Copying of eight pages is continued until copying of one volume is completed, whereupon copying of a second volume is again started from routine b. When copying of a desired number of volumes set in the register CMC is completed, the step proceeds to routine d, providing stand-by.

When the reverse copying is set by the switch FR after depression of the copy key, the read-out position is set in the last page of the memory having stored the image therein as previously described (step 714-2). When the number stored in the register ER differs from the last page, the page of the memory is segment-shifted to left (the memory is shifted to right) until the contents of the register ER becomes equal to the contents of the memory register MAC, whereby the memory is initially set to the desired last page (steps 714-8 to 714-10). Thereafter, as previously described, copying of the pages determined by the register MACC is successively executed in the reverse direction from the last page. When a desired number of copies is completed in a manner similar to that described above, the step proceeds to routine d to clear each register (step 730), thus providing stand-by.

As described above, it is possible to obtain a single copy or plural copies of only a desired page, to successively copy a first desired page to a second desired page, and to repetitively copy the desired pages for a required number of volumes and arrange the pages in good order. Also, the necessity of providing a sorter device for distributing copy paper is eliminated and it becomes easy to obtain a great number of volumes of copies having a well arranged page order.

Cancelling the image in the memory can be accomplished by once opening the switch SW for supplying power to the apparatus, thereby executing step 701. Of course, it is also possible to provide an image clearing key so that the discrimination of the input thereof is effected in routine 730, whereafter the step proceeds to step 701.

Figure 13:
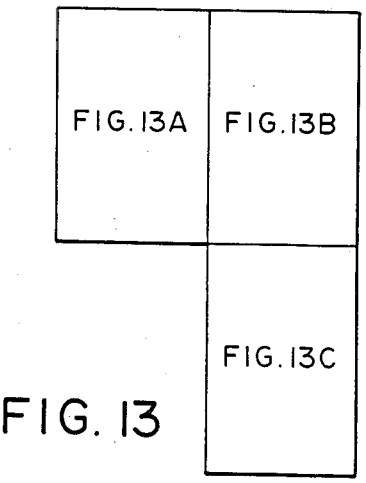
Figure 14:
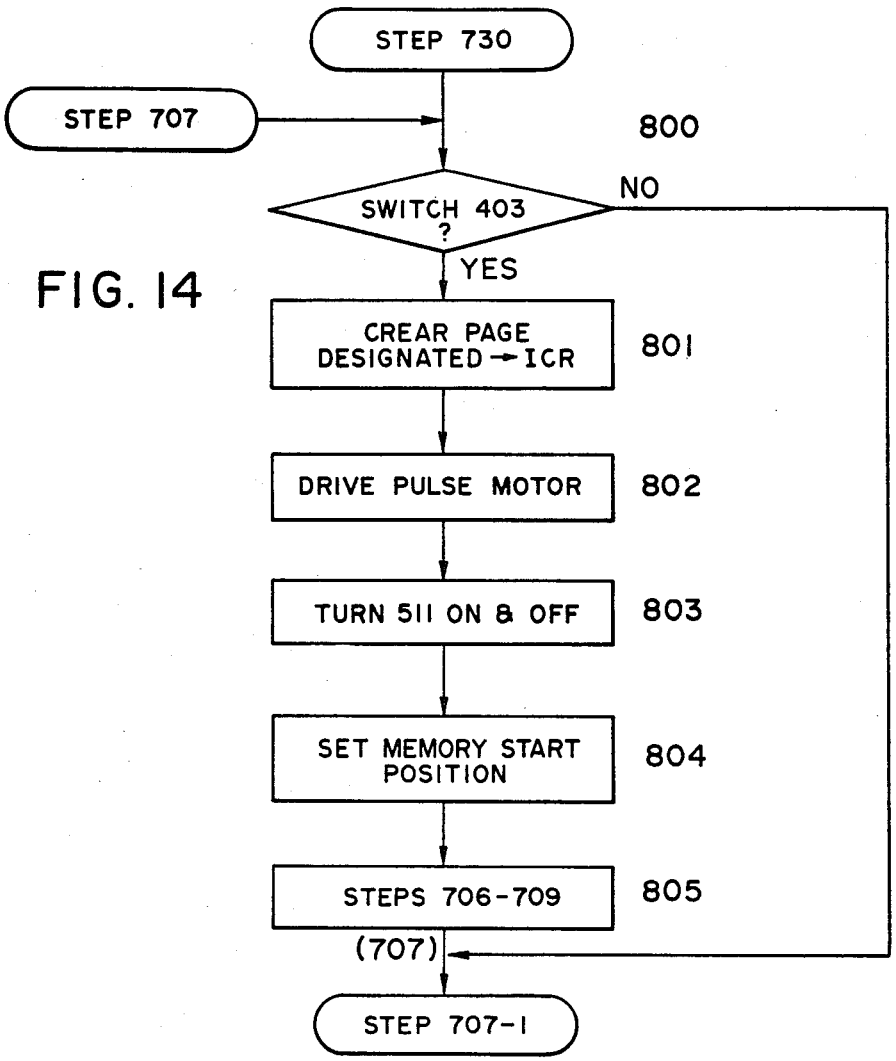

FIG. 14 is a control flow chart in which partial clearing or partial change of the image memory is made possible. By inserting this between the step 730 and the step 707-1 of FIG. 13, the control thereof can be accomplished. Step 800 determines the closing of a clearing switch 403. The switch 403 is provided on the panel 301 (FIG. 6). Where a new copying operation is to be effected without closing the switch 403 during the stand-by after termination of the previous copying, the control shifts to the aforementioned step 707-1. When the switch 403 is closed, the number of the ten-keys CSS next depressed is stored as the cleared page data in the register ICR (step 801). Then, the motor is driven to move the memory to that page (step 802). Then, a clearing power source 511 is switched on and off to clear the image of that page (step 803). Thereafter, the memory is initially set as in step 705 (step 804). Thereafter, the document image storage process similar to steps 706–709 is executed so that a new image can be stored in the cleared page in the memory. Thereafter, stand-by is provided to receive read-out and print instructions.

Also, in FIGS. 11A–11C and 14, if an address map of a number of document images stored in the memory is prepared, only a desired document image can be sought for and printed out only by a key and thus, charge of documents becomes easy.

Figure 15:
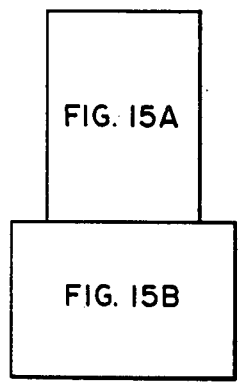
Figure 15A:
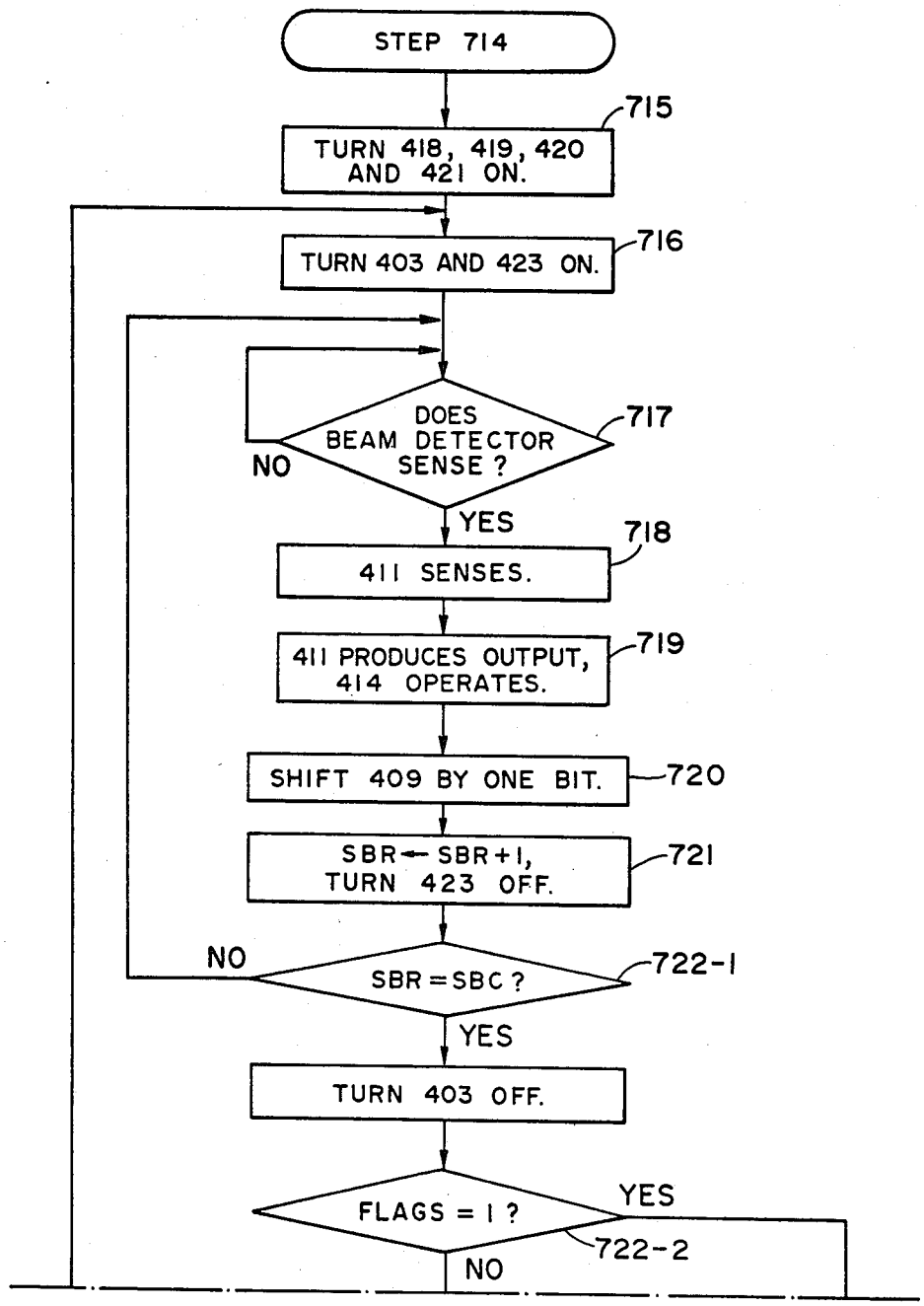
Figure 15B:
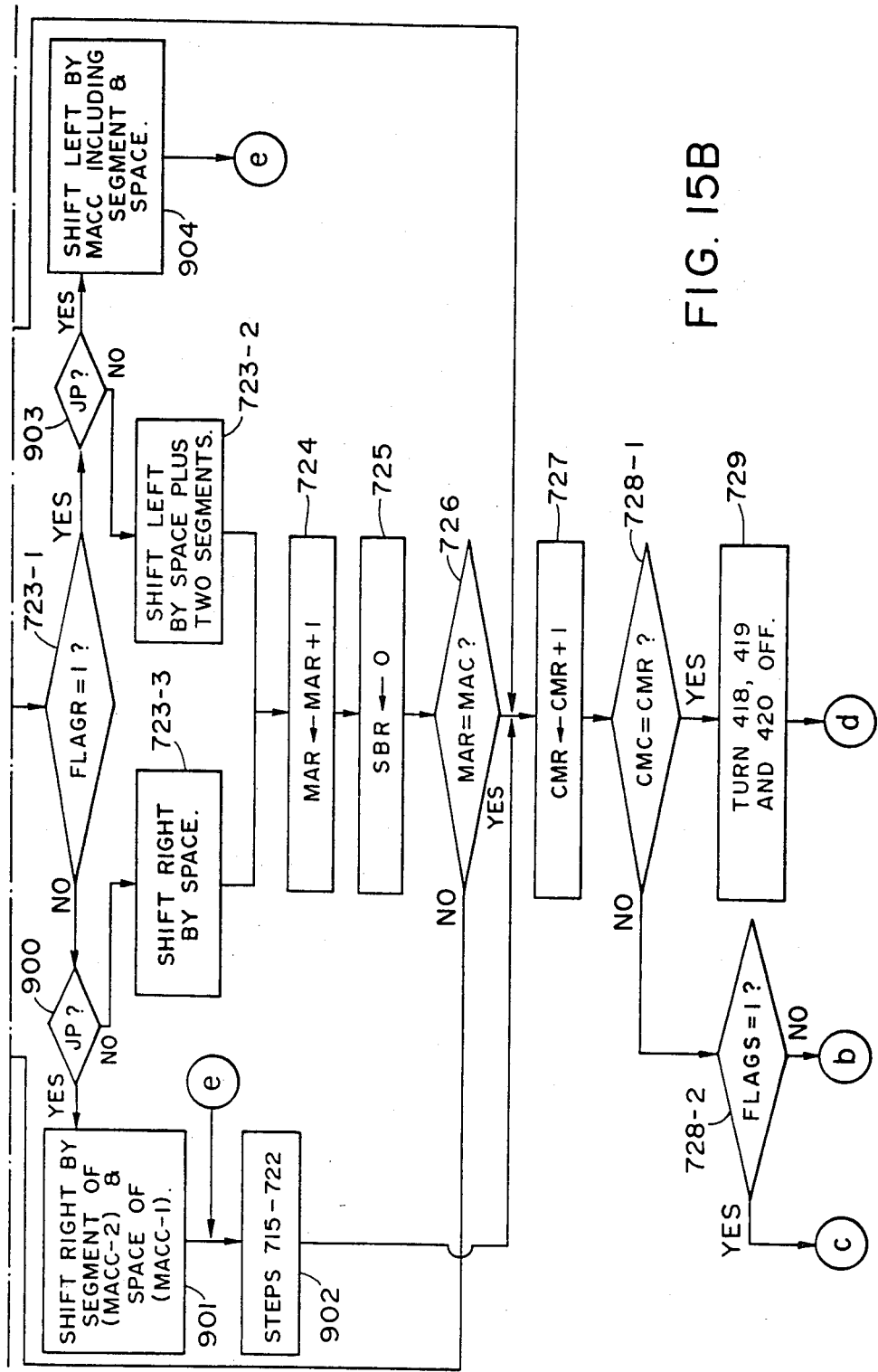

FIG. 15 is a flow chart in which a second page is copied after a desired first page of the memory has been copied and in which these two pages are sorted by a desired number and printed out (random jump mode). By replacing this with the step 715 and so on of FIG. 11, such control can be effected.

Assume that two copies of each of page 2 as a first page and page 9 as a second page are to be produced in the forward mode. As previously described, after completion of the copying of page 2, whether or not the forward-reverse flag is 1 is determined (step 723-1) and when in the forward mode, whether or not the mode is the jump mode is determined (step 901). The condition of the switch JP of FIG. 6 which changes over and selects the jump or the normal is determined by a microcomputer. When the mode is the normal, copying is executed by the producers of FIG. 11. When the mode is the jump, the memory is shifted to the page set in the register ER. That is, the motor is driven by effecting the space count of −2 segment count (MACC-1) of the number stored in the register MACC. This address control, as previously described, may also be effected by effecting the count of the motor driving pulses corresponding to the above-described segment space. When the setting of the second page is completed, the same operation as the read-out and print steps 715–722 of FIG. 11 is executed (step 902), whereby the copying of the second page (page 9) is completed and this copy is discharged onto the first copy. Then, the volume number counter register CMR is incremented (step 727). Then, the step again returns to step 713, in which the condition of the forward-reverse switch F/R is determined and, when this switch is in the forward mode, copying of pages 2 and 9 is repeated as described above and the copies are dischanged. As a result, the counter register CMR becomes coicindent with the number (2) stored in the register CMC (step 728-1), thus providing the stand-by mode.

Where two copies of pages 9 and 2 each are to be produced in the reverse mode, after termination of the copying of page 9, the memory is moved in step 904 by the segment and space corresponding to the number stored in the register MACC and the memory is address-set to page 2. Then, as previously described, the read-out and print of step 902 is executed so that copy sheets are piled on the discharge tray in the page order of 9-2-9-2 from below.

Likewise, the copy program and copy order program for the first to third pages also become possible.

It is also possible that the memory 304 is not provided with a space but an image is stored in the whole area while scanning it and a plurality of partial copies are printed out from the memory 304 by the procedures of FIGS. 11A–11C and 15. Also, if the forward-reverse switch F/R is changed over during the copying, the mode will be automatically changed over at the end of the copying of one volume. Further, as is apparent from FIGS. 5, 11A–11C, 14 and 15 which are the flow charts of the computer, the print start by the key CPB is blocked during the writing of documents into the memory and during the clearing of the memory image, thereby preventing malfunctioning. Also, even if the switches ICL and 403 concerned with the clearing of the memory are closed during the printing operation, the memory is locked so that no clearing operation takes place. The memory can be cleared only in stand-by. Likewise, during the printing operation, the operation of storing the image into the memory 304 by the memory key MR is also inhibited.

Also, if numbers which cannot be cleared are pre-stored in succession from the left page in the corner of each page of the image memory in the present embodiment and those numbers are read out and printed with the image, the page number can be automatically entered into the right lower end of the copy paper of reproduced image. Also, by taking into consideration a case where copying is started in the course of the memorization by the closing of the keys IRS and ERS, it is possible to provide a lamp above a bar lens (cellfock lens) 410 or near CCD so as to illuminate the right upper end of the lens corresponding to that page number and to prevent the page number from being reproduced by closing the lamp in the case of the copying started in the course of the memorization or in the case of the single page copying.

Figure 12:
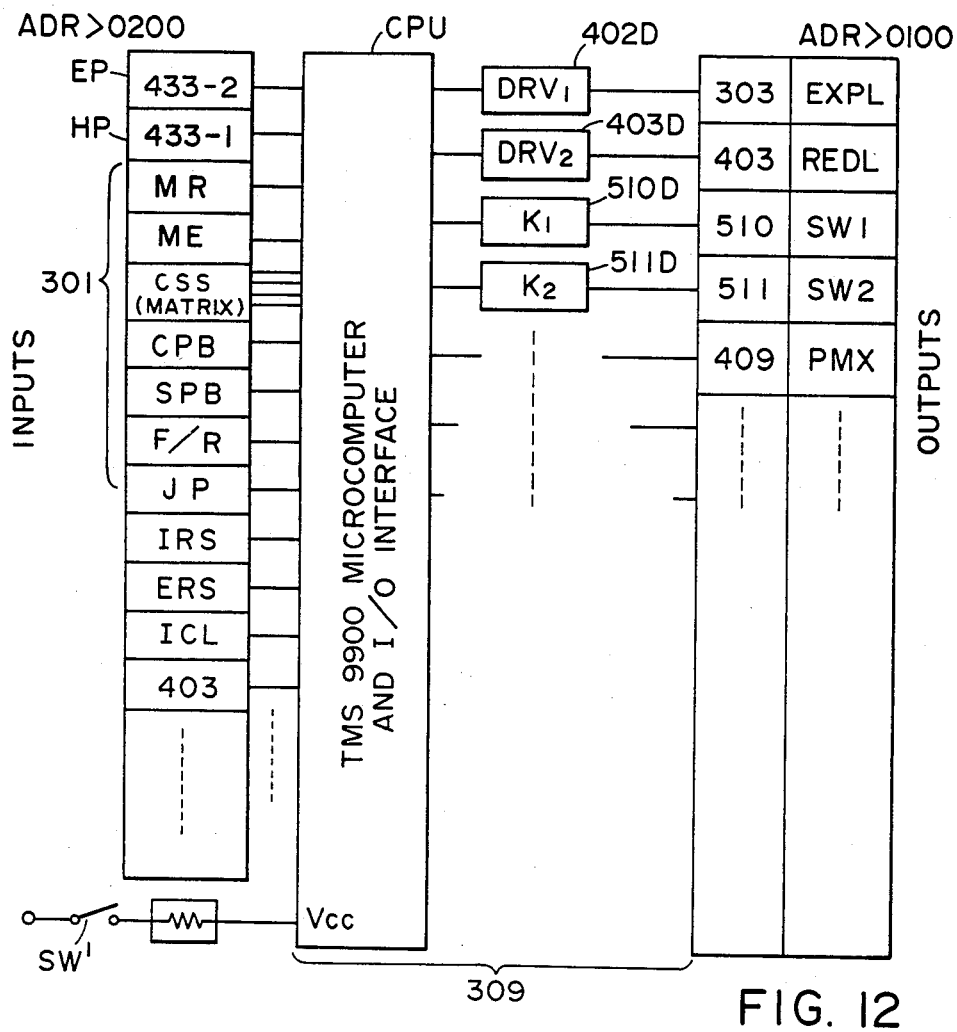
FIG. 12 is a control circuit diagram.

FIG. 12 shows an example of the circuit using the system of microcomputer TMS 9900 (Texas Instruments Inc.) as the controller 309 of FIG. 4. Designated by 402, 403, 510, 511, etc. are output loads as in FIG. 4. and denoted by 402D and 403D are well-known drive circuits for turning on the lamp. Designated by 510D and 511D are relays for closing and opening the switches. Through such drivers, each load is connected to the output port of CPU. Pulse motor 409 has input connections connected to ON and OFF signal lines from the CPU and the forward and reverse rotation signal lines.

Figure 13A:
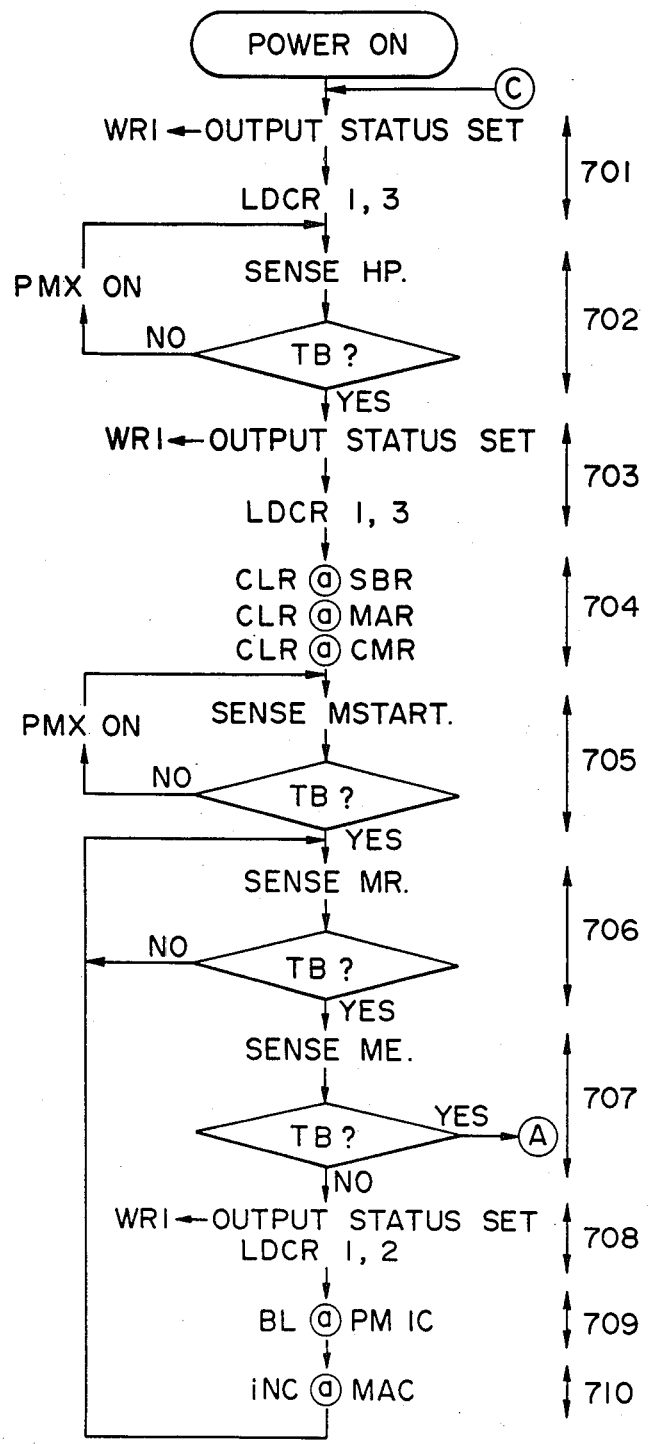
Figure 13B:
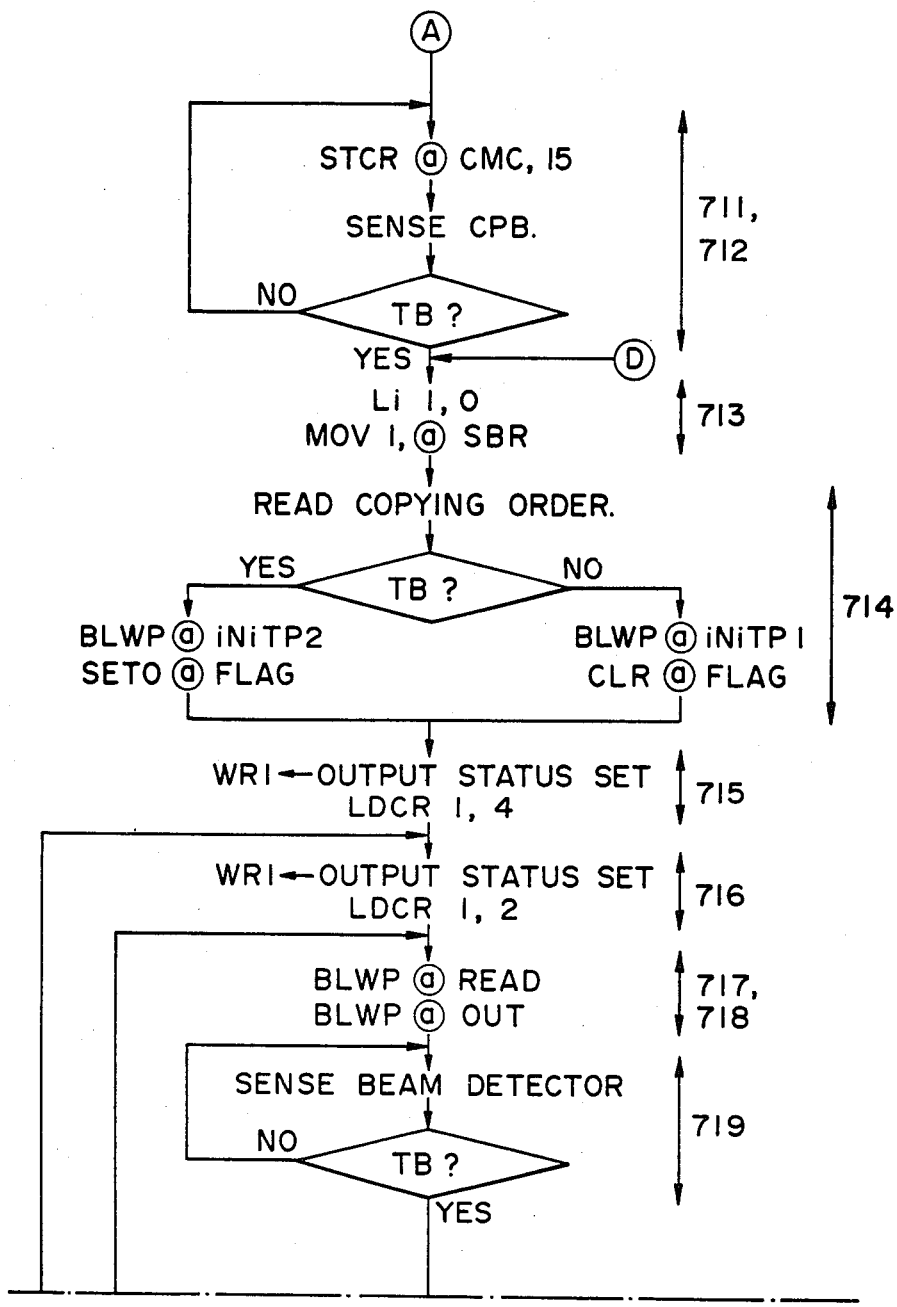
Figure 13C:
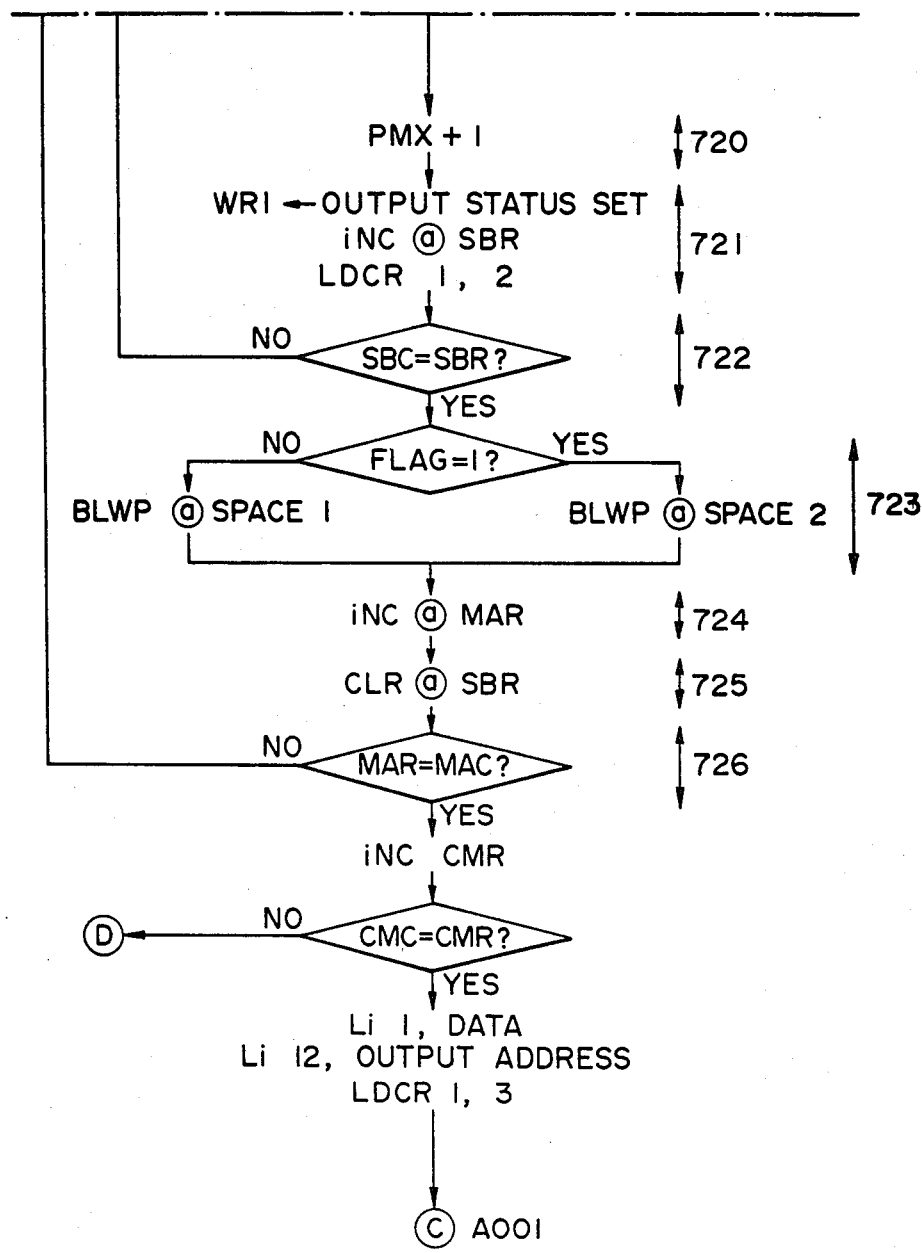

FIGS. 13A, 13B and 13C are a flow chart showing, on a machine word level, an example of the program sequences when the control in FIG. 4 is achieved by the use of TMS9900. The microcomputer system usually includes a memory ROM for storing the program sequences written in machine words and a memory RAM for taking in and out the data when this program is executed, and the program shown in FIGS. 4 and 13A–13C is written into the ROM while the RAM is used as the various registers MAR, MAC, etc. The instruction words LDCR, etc. in FIGS. 13A–13C are in accordance with the product manual of TMS9900.

Designated by BL and BLWP are programs which skip to subroutines, and the operation of reading the memory content into the CCD as in steps 717 and 718 and the operation of putting out such memory contents are executed in subroutines. The contents of these subroutines could be easily prepared by those skilled in the art.

An example of the actual program is shown in Table 2 below in instruction list. Programs can be prepared in this manner. The input port address is the address from 0200H (hexadecimal) and the output port address is the address from 0100H.

TABLE 2

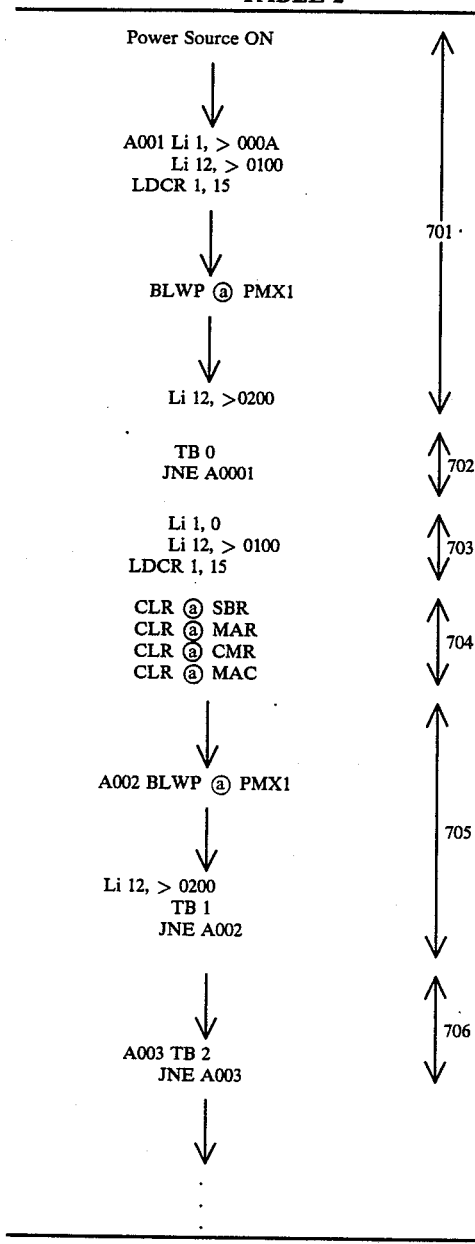

Likewise, the control flow of FIGS. 11A, 11B and 11C may be program-coded.

Thus, according to the present invention, a plurality of pages of originals are once stored in the image memory, and then they are converted into electrical signals and further into light signals, whereby a volume is recorded, and by repeating this, a plurality of volumes of copies may be obtained. Therefore, the originals required should only be pre-stored by the image memory. Accordingly, except for the trouble of prememorization, a plurality of volumes of copies having pages well arranged may be obtained completely automatically, thus saving the labor of the operator. Also, the sorter for arranging pages may be eliminated to make the entire apparatus more compact. Further, a plurality of original documents or articles of any shape may be automatically duplicated at high speed. In addition, if an optical memory such as liquid crystal is used as the memory, the half-toner or gray scale between light and shade may be simply stored to enable repetitive faithful reproduction of original images and this can be accomplished quite economically.

Further, where recording is to be effected by the use of an electrophotographic copying machine, the operator must wait for the copying until the fixing device or the like reaches a predetermined temperature after an actuation of the main switch of the copying machine, but in the meantime the information on the originals can be stored in the memory, thus shortening the time required for the copying.

What we claim is:

1. An image forming system comprising:
   image memory means for storing a plurality of image-defining information;
   means for causing image-defining information to be stored in said memory means;
   means for reading out the image-defining information from the memory means;
   means for image forming on a recording medium in accordance with serial data corresponding to the image-defining information read out from said memory means by said reading out means;
   control data memory means for storing control data for selecting the image-defining information stored in said image-defining memory means, said data memory means being capable of storing first control data corresponding to first image-defining information without cancelling second control data corresponding to second image-defining information; and
   means for controlling said reading out means in accordance with control data stored in said control data memory means so as to read out the desired first image-defining information in accordance with the first control data and second image-defining information in accordance with the second control data and for providing the serial data into said image forming means.

2. A system according to claim 1, wherein said controlling means provides plural image data into the image forming means corresponding to the plural information between the first image-defining information and second image-defining information.

3. A system according to claim 2, wherein said control means provides the plural image data serially into said image forming means.

4. A system according to claim 1, wherein said reading out means causes said memory means to move when reading out the image-defining information.

5. A system according to claim 1, further comprising input means for setting the control data in said control data memory means, and wherein said input means is capable of entering numerical data corresponding to a number of image formation operations.

6. A system according to claim 1, wherein said image forming means includes a photoconductive member and means for exposing a laser to said member in accordance with the data provided by said controlling means.

7. A system according to claim 5, wherein a first image formation operation and a second image formation operation are executed a plural number of times in accordance with the numerical data.

8. An image forming system comprising:
memory means for storing a plurality of image-defining information;
means for reading out the image-defining information from said memory means;
means for image forming on a recording medium in accordance with serial data corresponding to the image-defining information read out from said memory means by said reading out means;
control data memory means for storing control data for selecting an image-defining information stored in said image memory means, said control data memory means being capable of storing first control data corresponding to first image-defining information and second control data corresponding to second image-defining information; and
means for controlling said reading out means in accordance with control data stored in said control data memory means so as to read out the desired first image-defining information in accordance with the first control data and second image-defining information in accordance with the second control data and for providing the serial data into said image forming means.

9. An image processing apparatus comprising:
memory means for storing a plurality of image-defining information;
means for reading out image-defining information from said memory means in a sequence; and
control means operable to cause said reading out means to read out from said memory means the image-defining information corresponding to any selected first and second different stored images which are non-consecutive in said sequence.

10. An image processing apparatus comprising:
memory means for storing a plurality of image information;
means for reading out image-defining information from said memory means by a process involving photo detection to convert an image-defining information from an optical form to an electrical form;
means operable for selecting any group of stored image-defining information, both the first and last image-defining information in said group being selectable; and
controlling means operable to cause said reading out means to read out from the memory means the image-defining information corresponding to the selected group of image-defining information.

11. An image processing apparatus comprising:
memory means for storing a plurality of image-defining information;
means for causing image-defining information to be stored in said memory means;
means for reading out image-defining information from the memory means;
means operable for selecting any group of successively stored image-defining information, both the first and last image-defining information in said group being selectable; and
controlling means operable to cause said reading out means to read out from said memory means the image-defining information corresponding to the selected group of image-defining information.

12. An image processing apparatus comprising:
memory means for storing a plurality of image-defining information;
means for reading out any selected one of said image-defining information from said memory means by a process involving photo detection to convert an image-defining information from an optical form to an electrical form:
control data memory means for storing control data for selecting image-defining information from said memory means;
plural input means for selecting any single one of said image-defining information in said memory means, said input means causing said control data memory means to store data for grouping some of said image-defining information, and for selecting one of the image-defining information in said grouped image-defining information; and
means for controlling said reading out means in accordance with control data stored in said control data memory means so as to read out the desired single one of image-defining information from the memory means.

13. An image forming system comprising:
memory means for storing a plurality of image-defining information;
means for reading out any selected one of said image-defining information from said memory means;
control data memory means for storing control data for selecting image-defining information from said memory means;
plural input means for selecting any single one of said image-defining information in said memory means, said input means causing said control data memory means to store data for grouping some of said image-defining information, and for selecting one of the image-defining information in said grouped image-defining information; and
means for controlling said reading out means in accordance with control data stored in said control data memory means so as to read out the desired single one of image-defining information from said memory means and for generating repeatedly said desired one of image-defining information.

14. An image processing apparatus comprising:
memory means for storing information defining a plurality of images;
means for reading out image-defining information from the memory means;
means operable to select image-defining information to be read out by said reading out means; and
means operable to delete any selected portion of the image-defining information in said memory means.

15. An image processing apparatus according to claim 14, further comprising means operable to cause image-defining information to be stored in said memory means to replace the deleted image-defining information.

16. An image processing system comprising:
memory means;
reading means for causing a plurality of image-defining information representing a respective plurality of original images to be stored in said image memory means and for reading out the plurality of image-defining information from said memory means;
input means for entering data for selecting one of said image-defining information stored in said memory means;

data memory means for storing the data entered by said input means; and controlling means for controlling said reading means in accordance with said data stored in said data memory means for selecting and reading out an image-defining information from said image memory means, said control means further being operable to clear said data memory means after the completion of the read out operation from said memory means.

17. An image forming system comprising:

memory means for storing information defining a plurality of images;

means for reading out image-defining information from the memory means;

means for storing other information;

means for printing an image on a recording medium in accordance with an electrical signal representing the image-defining information read out by said reading out means;

input means for instructing a read out operation of said reading out means;

means for controlling said reading out means in accordance with the instruction by said input means so as to read out the image-defining information stored in said memory means, and for controlling said printing means to print the image defined by said information on recording media and to repeat the printing; and means for combining image-defining information read out from said image memory means and said other information to both be printed by said printing means in combination on a recording medium as controlled by said controlling means.

18. An image processing apparatus comprising:

memory means for storing a plurality of image-defining information;

means for reading out an image-defining information from said memory means by a process involving photo detection to convert the image-defining information from an optical form to an electrical form;

first means operable for selecting any of the stored image-defining information in said memory means;

second means for reading out in sequence a plurality of image-defining information stored in said memory means; and controlling means operable to cause said reading out means to read out from said memory means the image-defining information corresponding to the selected any one of image-defining information in accordance with first means and a plurality of image-defining information in accordance with said second means.

19. A system or apparatus according to one of claims 12, 13 or 17, wherein said controlling means further controls said reading out means to read out in sequence from the memory means a plurality of image-defining information.

20. A system or apparatus according to one of claims 12, 13 or 18, wherein plural image formation corresponding to the plurality of image-defining information is executed a plural number of times.

21. A system or apparatus according to one of claims 9, 10, 11, 12, 13, 14, 16, 17 or 18, further comprising key input means for entering numerical data for selecting an image-defining information from the memory means and for entering a data corresponding to a number of image formation operations.

22. A system or apparatus according to one of claims 10, 12, 13, 16, 17 or 18, further comprising means operable to delete any selected portion of the image-defining information in said memory means.

23. A system or apparatus according to one of claims 11, 12, 13, 16, 17 or 18, further comprising means operable to cause image-defining informaton to be stored in said memory means to replace a deleted image-defining information.

24. A system or apparatus according to one of claims 10, 12, 13, 14, 17 or 18, further comprising means operable to clear a data for selecting an image-defining information in the memory means after the completion of a read out operation from said memory means.

25. A system or apparatus according to one of claims 10, 12, 13, 14, 16 or 18, further comprising means for combining image-defining information read out from said image memory means and other information to both be printed in combination on a recording medium.

26. A system according of claim 16, wherein said controlling means also clears the data memory when a power source of the apparatus is actuated.

27. A system according of claim 17, wherein said controlling means further controls said reading out means to read out in sequence from the memory means a plurality of image-defining information, said combining means combining said plurality of image-defining information and the other information to both be printed.

28. A system or apparatus according to one of claims 12, 13, 16 or 27, wherein plural image formation corresponding to a selected plurality of image-defining information is effected.

29. A system or apparatus according to one of claims 1, 8, 11, 12, 13, 14, 16, 17 or 18, further comprising means for exposing an image, wherein said memory means stores image-defining information corresponding to the exposed image.

30. A system or apparatus according to one of claims 9, 10, 12, 13, 14, 16, 17 or 18, wherein said memory means is movable when the stored image-defining information is read out.

31. Apparatus according to claim 14, wherein said selecting means includes input means for selecting an image-defining information from said memory means, and for selecting the portion to be deleted.

32. A system according to claim 16, wherein said controlling means also clears a data for a number of image formation operations after completion of a read out operation.

33. A system or apparatus according to one of claims 1, 8, 10, 11 or 18, wherein said controlling means controls said reading out means to read out from the memory means the plurality of image-defining information in an order opposite to the order of storing the image-defining information in the memory means.

34. A system or apparatus according to one of claims 12, 13, 16 or 17, wherein said controlling means further controls said reading out means to read out from the memory means a plurality of image-defining information in an order opposite to the order of storing the image-defining information in the memory means.

35. Apparatus according to one of claims 9, 10, 12, 13, 16, 17 or 18, wherein a plurality of image formation operations corresponding to a selected plurality of image-defining information are executed a plural number of times in accordance with numerical data.

36. Apparatus according to claim 14, further comprising means for controlling the reading out means, such that the reading out means reads out in sequence from the memory means a plurality of image-defining information.

37. Apparatus according to claim 14, further comprising means for controlling said reading out means, such that the reading out means reads out a plurality of image-defining information in an order opposite to the order of storing the image-defining information in the memory means.

* * * * *

UNITED STATES PATENT AND TRADEMARK OFFICE
CERTIFICATE OF CORRECTION

PATENT NO. : 4,733,275

DATED : March 22, 1988

INVENTOR(S) : SUSUMU SUGIURA, ET AL

It is certified that error appears in the above-identified patent and that said Letters Patent is hereby corrected as shown below:

IN THE DRAWINGS

Sheet 2, Fig. 3, in box 308, "TRY" should read --TRAY--.
    Sheet 9, Fig. 11B, in box 714-1, "PESIGNATED" should read --DESIGNATED--.
    Sheet 15, Fig. 14, in step 801, "CREAR" should read --CLEAR--.

COLUMN 1

Line 22, "partcularly," should read --particularly--.
    Line 31, "(ADF)" should read --(ADF))--.
    Line 53, "matters" should read --matter--.

COLUMN 2

Line 2, "matters" should read --matter--.
    Line 19, "larger" should read --large--.

COLUMN 9

Line 58, "segement" should read --segment--.

COLUMN 11

Line 58, "judjed" should read --judged--.

COLUMN 12

Line 21, "step 13" should read --step 713--.
    Line 40, "return" should read --returns--.
    Line 68, "control 309" should read --controller 309--.

UNITED STATES PATENT AND TRADEMARK OFFICE
CERTIFICATE OF CORRECTION

PATENT NO. : 4,733,275
DATED : March 22, 1988
INVENTOR(S) : SUSUMU SUGIURA, ET AL It is certified that error appears in the above-identified patent and that said Letters Patent is hereby corrected as shown below:

COLUMN 14

Line 52, "repeatitively" should read --repetitively--.

COLUMN 15

Line 39, "producers" should read --procedure--.
Line 58, "dischanged." should read --discharged.--.
Line 59, "coicindent" should read --coincident--.

COLUMN 16

Line 45, "drive" should read --driver--.

COLUMN 18

Line 8, "half-toner" should read --halftone--.
Line 49, "claim 1," should read --claim 1 or 8,--.
Line 57, "claim 1," should read --claim 1 or 8,--.
Line 60, "claim 1," should read --claim 1 or 8,--.
Line 65, "claim 1," should read --claim 1 or 8,--.

COLUMN 19

Line 44, "photo detection" should read --photodetection--.

COLUMN 20

Line 6, "photo detection" should read --photodetection--.
Line 8, "form:" should read --form;--.

UNITED STATES PATENT AND TRADEMARK OFFICE
CERTIFICATE OF CORRECTION

PATENT NO. : 4,733,275

DATED : March 22, 1988

INVENTOR(S) : SUSUMU SUGIURA, ET AL

It is certified that error appears in the above-identified patent and that said Letters Patent is hereby corrected as shown below:

COLUMN 21

Line 40, "photo detection" should read --photodetection--.
Line 43, "any of" should read --any one of--.
Line 53, "with first" should read --with said first--.

COLUMN 22

Line 22, "of" should read --to--.
Line 25, "of" should read --to--.
Line 33, "12, 13, 16 or 27," should read --12, 13, 16, 18 or 27,--.
Line 37, "1, 8, 11, 12, 13, 14, 16, 17 or 18," should read --1, 8, 9, 11, 12, 13, 14, 16, 17 or 18,--.
Lines 66-67, "9, 10, 12, 13, 16, 17 or 18," should read --9, 10, 11, 12, 13, 16, 17 or 18,--.

Signed and Sealed this

Seventh Day of February, 1989

Attest:

DONALD J. QUIGG

Attesting Officer

Commissioner of Patents and Trademarks